US009789554B2

(12) United States Patent
Jin et al.

(10) Patent No.: US 9,789,554 B2
(45) Date of Patent: Oct. 17, 2017

(54) NANOMATERIALS FABRICATED USING SPARK EROSION AND OTHER PARTICLE FABRICATION PROCESSES

(71) Applicant: The Regents of the University of California, Oakland, CA (US)

(72) Inventors: Sungho Jin, San Diego, CA (US); Ami Berkowitz, Del Mar, CA (US)

(73) Assignee: The Regents of the University of California, Oakland, CA (US)

(*) Notice: Subject to any disclaimer, the term of this patent is extended or adjusted under 35 U.S.C. 154(b) by 473 days.

(21) Appl. No.: 14/351,700

(22) PCT Filed: Oct. 12, 2012

(86) PCT No.: PCT/US2012/060141
§ 371 (c)(1),
(2) Date: Apr. 14, 2014

(87) PCT Pub. No.: WO2013/056185
PCT Pub. Date: Apr. 18, 2013

(65) Prior Publication Data
US 2014/0291296 A1    Oct. 2, 2014

Related U.S. Application Data

(60) Provisional application No. 61/546,550, filed on Oct. 12, 2011.

(51) Int. Cl.
*B23H 7/00* (2006.01)
*B23H 1/08* (2006.01)
(Continued)

(52) U.S. Cl.
CPC ............. *B23H 1/08* (2013.01); *B23H 1/04* (2013.01); *B23H 9/001* (2013.01); *B23H 7/12* (2013.01)

(58) Field of Classification Search
CPC . B23H 1/04; B23H 9/001; B23H 1/08; B23H 7/12
(Continued)

(56) References Cited

U.S. PATENT DOCUMENTS 3,777,095 A * 12/1973 Muranaka ............... F26B 3/347
219/700
4,759,905 A * 7/1988 Walter ...................... B22F 9/14
136/239

(Continued)

FOREIGN PATENT DOCUMENTS

GB              968508     *  4/1961
KR    10-2004-0098623 A    11/2004
KR    10-2011-0056400 A     5/2011

OTHER PUBLICATIONS

Hansen, M.F., et al., "Exchange-spring permanent magnet particles produced by spark-erosion", Appl. Phys. Letters vol. 82, 2003, pp. 1574-1576.

(Continued)

*Primary Examiner* — Thien S Tran
(74) *Attorney, Agent, or Firm* — Perkins Coie LLP

(57) ABSTRACT

Methods, systems, and devices are disclosed for fabricating clean, oxidation-free nanoparticles of electrically conducting metals and alloys using spark erosion techniques. In one aspect, a method includes dispersing bulk pieces of an electrically conducting material in a dielectric fluid with mechanical vibrations within a container; generating an electric field using electrodes in the dielectric fluid using by an electric pulse, in which the electric field creates a plasma in a volume existing between the bulk pieces that locally heats the bulk pieces to form structures within the volume, the dielectric fluid quenching the structures to form nanoparticles, and filtering the nanoparticles through a screen including holes of a size allowing nanoparticles of the size (Continued)

or smaller to pass through the screen to a region in the container, in which the dielectric fluid inhibits oxidation of the surface of the nanoparticles.

38 Claims, 17 Drawing Sheets

(51) Int. Cl.
  *B23H 1/04* (2006.01)
  *B23H 9/00* (2006.01)
  *B23H 7/12* (2006.01)
(58) Field of Classification Search
  USPC .............. 219/69.13, 69.16, 69.17, 121.59; 204/164, 173, 486, 491, 563
  See application file for complete search history.

(56) References Cited

U.S. PATENT DOCUMENTS

| | | | |
|---|---|---|---|
| 6,652,967 B2* | 11/2003 | Yadav | B01J 12/02 427/201 |
| 8,016,944 B2 | 9/2011 | Kortshagen et al. | |
| 2003/0102222 A1* | 6/2003 | Zhou | B82Y 30/00 205/109 |
| 2007/0080054 A1* | 4/2007 | Parkansky | B01J 8/005 204/164 |
| 2008/0202575 A1* | 8/2008 | Ren | H01L 35/16 136/201 |
| 2008/0296147 A1 | 12/2008 | Jaksic | |
| 2010/0163534 A1 | 7/2010 | Riccardi et al. | |

OTHER PUBLICATIONS

Tang, Y.J. et al., "Microstructure and exchange coupling in nanocrystalline Nd2(FeCo)14B/α-FeCo particles produced by spark erosion", Appl. Phys. Lett. vol. 86, Issue 12, 2005, pp. 122507-122509.

International Search Report and Written Opinion of International Application No. PCT/US2012/060414; dated Mar. 25, 2013; 10 pages.

* cited by examiner

190

```
┌─────────────────────────────────────────────────────────────┐
│ Disperse bulk pieces of an electrically conducting material in a │
│            dielectric fluid within a container              │
│                         (191)                               │
└─────────────────────────────────────────────────────────────┘
                              │
┌─────────────────────────────────────────────────────────────┐
│ Generate an electric field in the dielectric fluid using an electric │
│ pulse to produce nanoparticles from plasma between the bulk │
│ pieces that forms structures quenched in the dielectric fluid │
│                         (192)                               │
└─────────────────────────────────────────────────────────────┘
                              │
┌─────────────────────────────────────────────────────────────┐
│        Filter the nanoparticles of a particular size or smaller │
│                         (193)                               │
└─────────────────────────────────────────────────────────────┘
```

FIG. 1A

NANOMATERIALS FABRICATED USING SPARK EROSION AND OTHER PARTICLE FABRICATION PROCESSES

CROSS REFERENCE TO RELATED APPLICATIONS

This application is a 35 USC 371 National Stage application of International Application No. PCT/US2012/060141 filed Oct. 12, 2012, which further claims benefit of priority of U.S. Provisional Patent Application No. 61/546,550 entitled "MANUFACTURABLE SPARK EROSION APPARATUS FOR NANOPARTICLES, METHOD OF FABRICATION, AND ARTICLES FABRICATED FROM NANOPARTICLES," filed on Oct. 12, 2011, the disclosures of which are incorporated by reference as part of this document.

TECHNICAL FIELD

This patent document relates to nanoscale materials, including compositions, structures and fabrication of nanoparticles.

BACKGROUND

Nanotechnology provides techniques or processes for fabricating structures, devices, and systems with features at a molecular or atomic scale, e.g., structures in a range of one to hundreds of nanometers in some applications. For example, nano-scale devices can be configured to sizes similar to some large molecules, e.g., biomolecules such as enzymes. Nano-sized materials used to create a nanostructure, nanodevice, or a nanosystem that can exhibit various unique properties that are not present in the same materials at larger dimensions and such unique properties can be exploited for a wide range of applications.

SUMMARY

Systems, devices, and methods for fabrication of electrically conducting metal, alloy, and semiconductor nanostructures using spark erosion techniques are disclosed.

The subject matter described in this patent document can be implemented in specific ways that provide one or more of the following features. For example, the disclosed spark erosion systems, devices, and methods can be implemented to produce engineered materials and structures including metallic or semiconducting nanoparticles and consolidated structures from the metallic or semiconducting nanoparticles used in a variety of applications, e.g., including, but not limited to, mechanical strengthening, enhanced catalytic reactions, improved magnetic properties, thermoelectric properties, optical materials, and energy storage and generation. For example, the disclosed technology can include articles made of spark eroded nanoparticles of the methods, systems, and apparatuses described above that include energy materials such as solar cells, batteries, thermoelectric device materials, energy conversion catalytic nanoparticles, information storage materials, magnetic actuators, piezoelectric actuators, shape memory actuators, conductive paste or adhesive materials, drug delivery nanoparticles, dispersion hardening fillers for metals polymers, ceramics, elastomeric materials, explosive materials, surface plasmon fluorescent materials, quantum dot fluorescent materials. Various other materials and device claims may also be formulated utilizing the descriptions in the figures and the text. The disclosed technology can produce high-quality, clean metallic nanoparticles having a diameter less than 100 nm, e.g., less than 50 nm or 30 nm, by spark erosion under process conditions including a high applied voltage and high capacitance using a dielectric liquid as the spark erosion medium. For example, higher production rate for synthesis of metallic nanoparticles can be accomplished by using the disclosed spark erosion systems and devices that enables continuous synthesis of metallic nanoparticles. In some implementations, an exemplary spark erosion device can include one of more of the rate-increasing mechanisms that can include valve-controlled continuous or continual feeding of spark charge feedstock pieces, valve-controlled continuous or continual nanoparticle collection components, and rotatable/replaceable spark erosion chamber arrays. In some implementations, an exemplary spark erosion device can include a spark erosion mechanism using rotating disk electrodes that increase the frequency of sparking. For example, these exemplary spark erosion devices can be configured with multiple electrode arrays made of spark-erodeable material in parallel or circular configurations, e.g., in order to enhance the uniformity of spark erosion activities at increased number of local discharge contact points in the reaction chamber.

BRIEF DESCRIPTION OF THE DRAWINGS

FIG. 1A shows a flow diagram of an exemplary method of producing nanoparticles by spark erosion.

FIG. 19 shows a schematic illustration of

Like reference symbols and designations in the various drawings indicate like elements. Drawings are for purposes of illustrating exemplary concepts of the disclosed technology and may not be to scale.

DETAILED DESCRIPTION

Figure 1B:
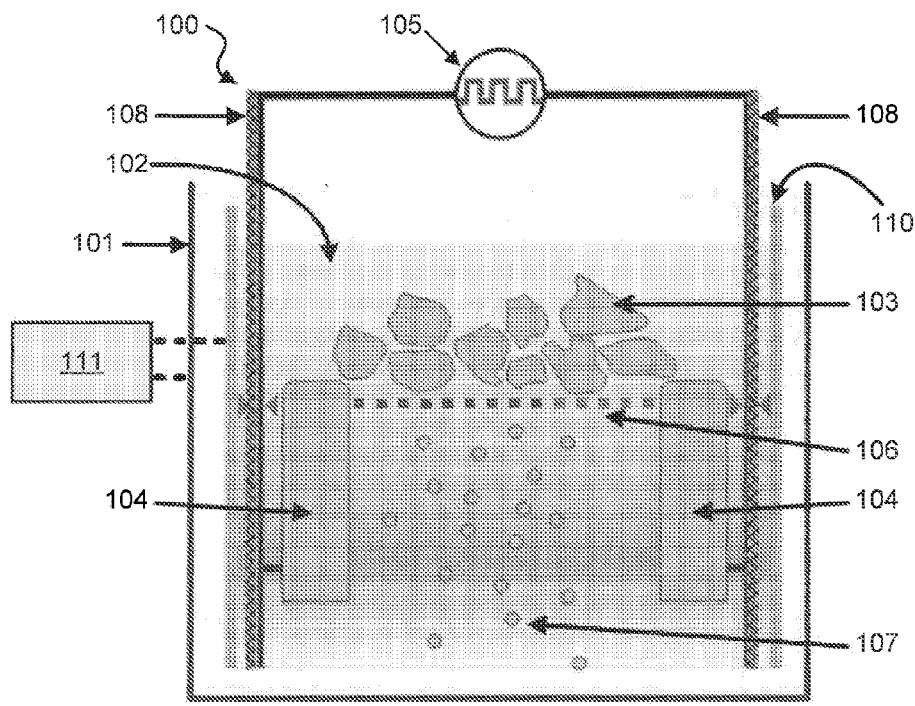
FIG. 1B shows a schematic of an exemplary spark erosion device for nanoparticle synthesis.

Nanoparticles are useful for a variety of applications, e.g., including magnetic recording media, catalyst particles, energy materials such as batteries, supercapacitors, thermoelectrics, dye sensitized solar cells, photovoltaic solar cells, biotech sensors and drug delivery particles, anti-reflector layers, cosmetics, and paints. Nanoparticles can be produced by a number of different methods and some conventional fabrication methods include, for example, atomization, chemical precipitation or mechanical grinding (milling) Implementations of these and other conventional fabrication methods tend to pose limitations that can impede or restrict the production of particles having the desired nanoscale dimensions and/or surface properties, particularly when fabricated for industrial scale yields and throughput. For example, mechanical grinding of thermoelectric alloys to nanosized particles tends to require long processing times (e.g., many hours for each batch) and may cause unwanted surface oxidation of the alloy particles. The wear of steel balls or ceramic balls by the fabricated particles during the grinding process can lead to undesirable contamination of the alloy particles. In addition, grinding tends to yield particles with varying sizes and geometries and uniformly-sized and spherical particles can be difficult to obtain by mechanical grinding based processes.

Clean, unoxidized metallic or semiconducting nanoparticles can be difficult to fabricate without a good vacuum atmosphere, particularly if the desired particles require an oxidation-free surface. An oxidation-free surface is a surface that is completely free or substantially free of oxygen content or oxygen materials. In some implementations, a surface with a low level of oxidation is a oxidation-free layer. For example, the level of oxidation can be less than 1 wt %, e.g., and in some examples can be less than 0.5 wt % or less than 0.2 wt %.

Other nanoparticle synthesis techniques such as aqueous chemical processing and molten metal processing can be used to make metallic nanoparticles but can lead to particle surface oxidation. For example, some aqueous precipitation processes or atomization processes can have engineering and fabrication limitations on the uniformity and minimum size of nanoparticles, e.g., due to particle coarsening in these methods. Metallic, bulk alloy, or semiconductor particles can be synthesized by pulverization of bulk ingots. However, mechanical pulverization tends to require a long processing time (e.g., many hours, particularly for fabrication of nanoparticles with diameter regimes in the 100 nm or smaller) and may suffer from accompanying contaminations from ball milling spheres and surface oxidation due to, e.g., friction-induced heating and hours of exposure to atmosphere during grinding time.

Spark erosion is a process for manufacturing metallic or semiconductor materials from a bulk workpiece and can be implemented in various ways. In spark erosion, an electrical current is discharged between two electrodes in the presence of a dielectric liquid to produce a spark. The repeated action of the discharge can remove material from the workpiece to form the particles.

Described herein are engineered nanomaterials and systems, devices, and methods of their fabrication including spark erosion techniques to engineer electrically conducting metal, alloy, or semiconductor nanostructures.

In one aspect, the disclosed technology includes systems, devices, and methods of spark erosion for synthesis of metallic or semiconducting nanoparticles with clean oxidation-free surfaces (e.g., including spherical nanoparticles) at an increased production rate. The term "metallic" is used inclusively to include traditional metals and alloys as well as highly conductive compounds, e.g., such as conductive oxides, conductive nitrides, and conductive ceramics in general. These compounds can also be made into spark erosion electrodes and charge pieces for similar sparking operations. For example, the described spark erosion techniques can be used for fabricating metallic nanoparticles having 10-100 nm size regime, as well as larger particles, e.g., including metallic micro-particles. For example, the described spark erosion techniques can include process conditions including high applied voltage and high capacitance, and an oxygen-free dielectric liquid at below minus 100° C. (e.g., liquid nitrogen temperature of −196° C. or liquid argon temperature of −189° C.) as the spark erosion medium. The exemplary spark eroded metallic nanoparticles fabricated by the described spark erosion techniques can be by themselves nanograin structures or single crystal nanoparticles. Alternatively, the spark erosion can produce amorphous nanoparticles that can be crystallized by subsequent annealing. Exemplary spark eroded metallic nanoparticles can be used as the main component in the fabrication of other nano- and micro-particles, e.g., including composite particles and materials. For example, implementation of the described spark erosion methods can be performed with an increased rate of particle synthesis, as compared to conventional nanoparticle fabrication techniques, e.g., which can be associated with reduced manufacturing cost that can be of paramount importance for successful commercial manufacturing and device applications.

FIG. 1A shows a flow diagram of an exemplary method 190 of producing nanoparticles by spark erosion. The method 190 includes a process 191 to disperse bulk pieces of an electrically conducting or semiconducting material in a dielectric fluid within a container. The method 190 includes a process 192 to generate an electric field using electrodes in the dielectric fluid by an electric pulse in a series of electric pulses, in which the electric field creates a plasma in a volume existing between the bulk pieces that locally heats the bulk pieces to form structures within the volume, such that the dielectric fluid quenches the structures to form nanoparticles, in which the dielectric fluid inhibits oxidation of the surface of the nanoparticles. The method 190 includes a process 193 to filter the nanoparticles through a screen including holes of a size allowing nanoparticles of the size or smaller to pass through the screen to a region in the container.

FIG. 1B shows an exemplary spark erosion device of the disclosed technology to produce spark eroded nanoparticles 107 with reduced or substantially no surface oxidation. The exemplary spark erosion device includes a container 101 that contains a dielectric fluid 102. For example, the container 101 can be made of metal, glass, ceramic, composite or polymer material. For example, the dielectric fluid 102 can be a fluid that is free of oxygen, and the utilization of the dielectric fluid 102 in the disclosed spark erosion processes can inhibit oxidation of the produced nanoparticles 107. For example, the dielectric fluid 102 can include liquid argon or liquid nitrogen. If the surface oxidation is not a critical factor, other medium such as water or organic liquid may also be utilized. The spark erosion device includes a spark erosion cell 100 configured in a shaker-pot configuration such that electrodes 104 are positioned at a distance apart and immersed in the dielectric fluid 102, in which the spark erosion cell 100 and/or the container 101 is vibrated along one or more axes. The spark erosion cell 100 can include a frame structure or housing 110 to provide positioning and/or structural support to various modules and/or components, e.g., such as the electrodes 104. In some implementations, the frame structure 110 can be loaded and unloaded in the container 101, or, in other implementations, the container 101 can be included as part of the spark erosion cell 100 that functions as a frame structure to provide positioning and/or structural support to the various components and/or modules of the spark erosion cell 100. The spark erosion cell 100 includes a perforated screen 106 coupled to the frame structure 110 and structured to expose a region of the electrodes 104 through the top surface of the perforated screen 106. The spark erosion device includes a pulse power supply 105 located outside of the container 101 and connected to the electrodes 104 via insulated electrode leads 108. Charge pieces 103 formed of the material of interest (e.g., such as an electrically conductive or semiconductive material, including metals and alloy materials) can be deposited on the top surface of the perforated screen 106 of the spark erosion cell 100. For example, the charge pieces 103 can include bulk size charge pieces (e.g., having ~2 cm diameter), which are disposed on the perforated screen 106 such that they are capable of making contact with the exposed region of the electrodes 104. For example, the electrodes 104 can also be formed of the same material of interest as the charge pieces 103. In some implementations, the spark erosion device includes a gyrator or other movement-producing mechanism 111 coupled to the container 101 that vibrates, shakes, spins, or generates other mechanical motion on the container 101 to move the charge pieces 103 within the dielectric fluid to produce various contacts between the charge pieces 103 and the electrodes 104. In some implementations, the spark erosion cell 100 includes the gyrator or other movement-producing mechanism 111 coupled to the frame structure 110 that vibrates, shakes, spins, or generates other mechanical motion of the spark erosion cell 100. For example, the spark erosion cell 100 can be vibrated by the gyrator 111 (or, for example, via the container 101 gyrated by the gyrator 111) such that the charge pieces 103 can be moved around within the container to make an electrical contact with the electrodes 104, e.g., in which the electrical contact between them is continuously made and broken.

An electric field can be generated between the electrode 104 and the charge piece 103 in the dielectric fluid 102 using an electric pulse generated by the pulse power supply 105, in which the electric field creates a microplasma (spark) in a volume formed in a gap existing between the charge piece 103 and the electrode 104 that locally superheats the materials to form structures within the volume, e.g., in which the formed structures are quenched by the dielectric fluid 102 to produce the spark eroded nanoparticles 107. For example, the produced spark eroded nanoparticles 107 can include a diameter less than 100 nm, and in some examples, less than 50 nm or 30 nm. For example, in the described exemplary shaker-pot configuration of the spark erosion cell 100, the electrical contact between the electrodes 104 and the charge pieces 103 is made randomly. The perforated screen 106 can be structured to allow the nanosized spark eroded nanoparticles 107 to pass through holes along the screen structure to a collection region of the container 101 (e.g., which can be located at the bottom of the container 101), while preventing the charge pieces 103 from passing through. In some examples, the container 101 can be configured with one or more walls and structured to include a cylindrical geometry, in which the spark erosion cell 100 is mounted in the container 101 such that the electrodes 104 and perforated screen 106 are fully immersed in the dielectric fluid 102. For example, the electrode material can be raised after it has been eroded.

In some implementations, the pulsed power source 105 is a charged capacitor. For example, when the gaps among the electrodes 104 and charge pieces 103 are small enough so that the electric field across them is larger than the dielectric breakdown field, the capacitor discharges, producing a spark (microplasma) between the pieces involved. This microplasma, e.g., which can include electrons and positive ions, can be of a temperature on the order of 10,000 K. The kinetic energies of the faster electrons and slower ions are deposited on localized regions where the spark was initiated, e.g., superheating them to boiling. When the spark collapses, vaporized alloy and molten droplets are ejected from the boiling regions, and propelled though the plasma region into the dielectric liquid, where they are very rapidly condensed/ quenched. For example, the vaporized portion of the metal or alloy material forms the spark eroded nanoparticles 107, e.g., as the vapor nucleates densely and freezes into extremely small nanoparticles. The molten metal or alloy droplets quench into micrometer size regime particles. For example, since the quenching rate is very rapid, even the particles in the micrometer range can have very small grain sizes. In situ quenching of the droplets or condensed vapor can produce substantially spherical shaped particles with nanocrystalline or even amorphous substructure. These particles can pass through the perforated mounting screen 106 to the bottom of the cell 100, and are subsequently collected and processed. For example, the container 101 containing the spark eroded nanoparticles 107 can be brought into an enclosed glove box or other enclosure having an inert atmosphere, and the dielectric fluid 102 (e.g., liquid nitrogen or liquid argon) can be permitted to evaporate. The nanoparticles can then further processed, if desired for example, for separation of the spark eroded nanoparticles 107 into different size groups, e.g., by sieving, gravitational separation or centrifugal separation. These processing steps can be conducted in an inert atmosphere to inhibit surface oxidation of the nanoparticles 107.

For example, pulsed power source 105 can produce sparks between the charge pieces 103 and electrodes 104 in the spark erosion cell 100 that can be actuated more than 20 times per second, e.g., including frequencies of at least 50 times per second, based on an oscillator voltage which can be configured at 50-60 Hz in the range of 50-400 V and capacitance 5-200 µF. Alternatively, a higher frequency spark erosion operation in the range of 60-2,000 Hz can also be used for faster production of nanoparticles. For example, a higher power (e.g., higher voltage and/or higher capacitance) spark erosion tends to cause more material to vaporize (e.g., by increase the violence of the sparking), and hence more condensed nanoparticles, and a lower power spark erosion process tends to produce more molten materials and hence more condensed microscale particles rather than the nanoparticles. This can result in finer nanoparticle size and more molten droplet formation for higher yield of the desired nanoparticle sized spark erosion product. Thus, in one example, the spark erosion device can be operated with an oscillator voltage set to a voltage of 200 V and a capacitance of 80 µF (e.g., or 100 µF in other examples) for spark erosion of the metals and alloys to create the nanoparticles 107 or particles having nanograins or articles having amorphous structure.

Also, for example, the described spark erosion can be operated with the dielectric fluid 102 at temperatures below minus 100° C., e.g., by using an oxygen-free dielectric liquid such as liquid Ar or liquid nitrogen, to minimize the formation of surface oxide during high temperature spark erosion as the sparking temperature is often in excess of 10,000 K. In some examples, water or organic liquid may also be utilized as the dielectric fluid 102 if a small amount of surface oxidation is acceptable. For example, a rapid quenching of the nanoscale molten droplet of thermoelectric alloy, e.g., greater than $10^6$ K/sec, can be obtained using water as the spark erosion dielectric medium. Spark erosion in water may also advantageously produce much higher yield of nanoparticles of metals and alloys. For example, other dielectric spark erosion mediums can be used including dodecane or ethyl acetate.

Figure 1C:
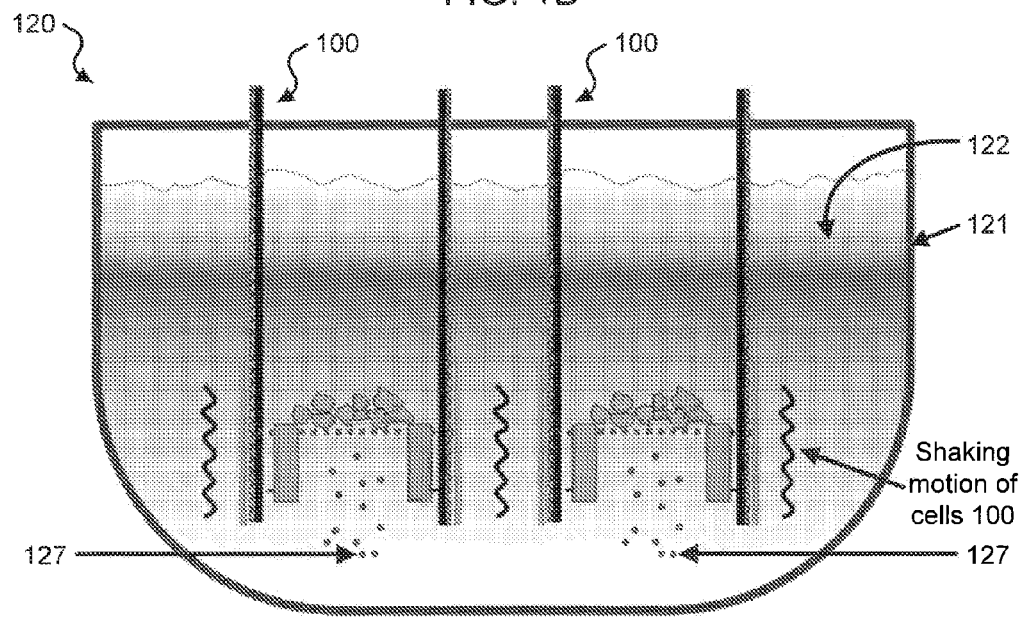
FIG. 1C shows a schematic of an exemplary spark erosion device including multiple spark erosion cells for nanoparticle synthesis.

FIG. 1C shows a schematic of a spark erosion device 120, in which a container (or pot) 121 includes a plurality of spark erosion cells 100 that undergo an applied motion within a dielectric medium 122. For example, implementation of the spark erosion device 120 to produce the spark eroded nanoparticles 107 can include vibrating or shaking the spark erosion cells 100 along one or more axes, e.g., such as in the lateral direction as shown in the figure.

Figure 2A:
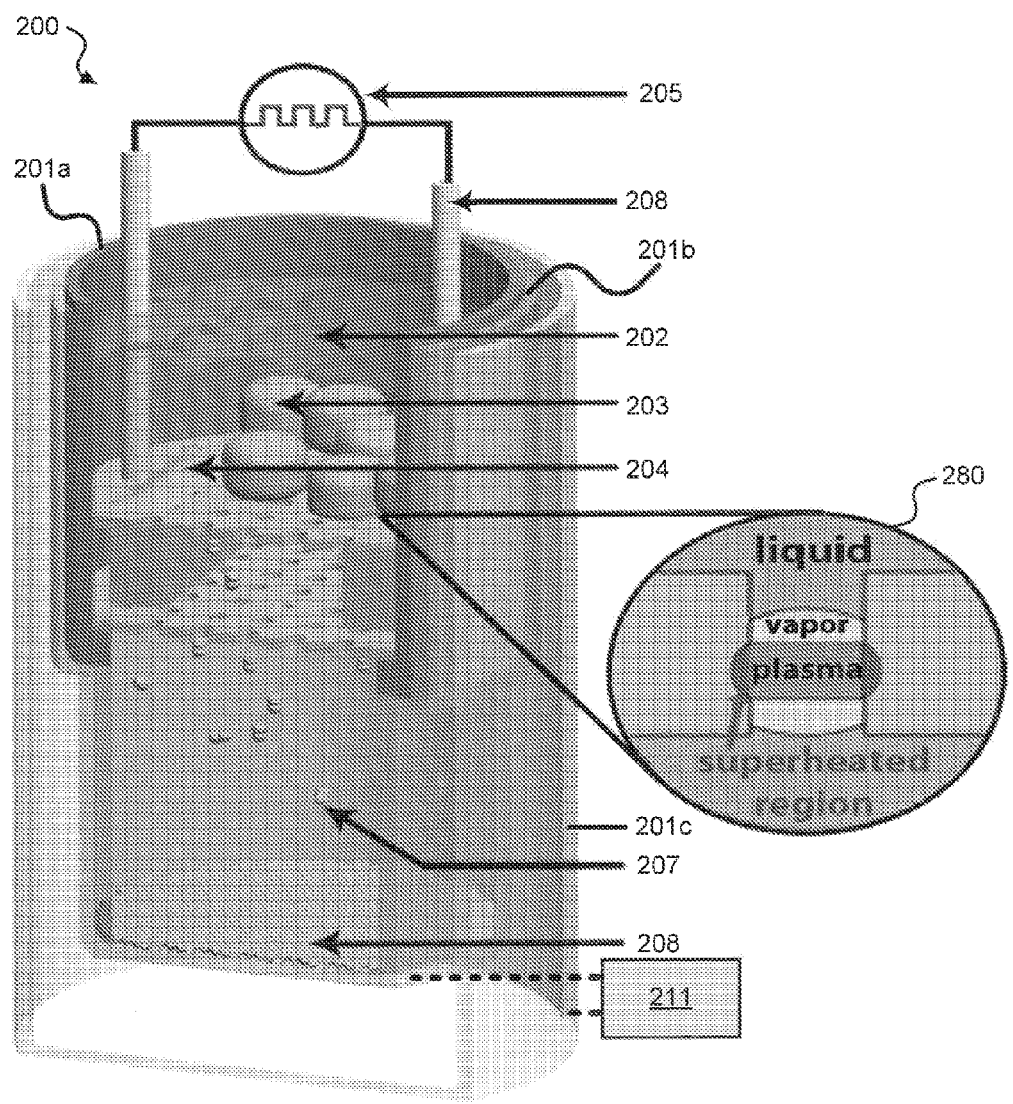
FIG. 2A shows a schematic of an exemplary spark erosion device for nanoparticle synthesis.

FIG. 2A shows exemplary schematic of another spark erosion device 200 to produce spark eroded nanoparticles 207, e.g., which can be produced with reduced or substantially no surface oxidation. The exemplary spark erosion device 200 includes a multilayered container 201, e.g., including an inner layer 201a, an intermediate layer 201b, and an outer layer 201c, to provide a casing for a spark erosion cell configured in a shaker-pot configuration within the multilayered container 201. In some implementations of the exemplary device 200, the container 201 can be configured as a double-walled, vacuum-jacketed glass container having a cylindrical geometry with a 10 cm diameter. For example, a dielectric fluid 202 can be contained within the inner layer 201a, which can be structured to include an aperture at a bottom surface of the inner layer 201a that leads to a particle collecting chamber formed by the intermediate layer 201b. The outer layer 201c can be structured to surround the intermediate layer 201b creating a void between these layers, in which the void can provide a vacuum, e.g., in which substantially no air or fluid filling the void between the outer layer 201c and the intermediate layer 201b. The dielectric fluid 202 that is contained within the inner layer 201a and intermediate layer 201b can be a fluid that is free of oxygen, and the utilization of the dielectric fluid 202 in the disclosed spark erosion processes can inhibit oxidation of the produced nanoparticles 207. For example, the dielectric fluid 202 can include liquid argon or liquid nitrogen. For example, the inner layer 201a can be structured to hold in place one or more perforated screens 206 configured substantially perpendicular to the cylindrical interior of the container 201. For example, the device 200 can include multiple perforated screens 206 configured as a top screen and a bottom screen, in which electrodes 204 are located between the top and bottom screens such that part of the electrodes 204 is protruded through the top screen to expose a portion of the electrodes 204 above the top surface of the top screen. The two electrodes 204 are positioned at a distance apart and immersed in the dielectric fluid 202 in the container 201, in which the spark erosion cell and/or the multilayered container 201 is vibrated along one or more axes. For example, in some implementations, the spark erosion device includes a gyrator or other movement-producing mechanism 211 coupled to the container 101 (e.g., coupled to the inner layer 201a or the intermediate layer 201b inside the container 201 or coupled to the outer layer 201c outside of the container 201) that vibrates, shakes, spins, or generates other mechanical motion on the container 201 to move the charge pieces 203 within the dielectric fluid 202 to produce various contact between the charge pieces 203 and the electrodes 204. The spark erosion cell includes a pulse power supply 205 located outside of the multilayered container 201 and connected to the electrodes 204 via insulated electrode leads 208. Charge pieces 203 formed of the material of interest (e.g., such as an alloy material) can be deposited on the top surface of the top screen of the perforated screens 206 of the spark erosion cell. The perforated screens 206 can be structured to allow the nanosized spark eroded nanoparticles 207 to pass through holes along the screen structure to the collection region at the bottom of the intermediate layer 201b of the container 201, while preventing the charge pieces 203 from passing through. In some examples, the top and bottom perforated screens 206 can be configured to have the same size holes to filter the particles producing by spark erosion. In other examples, the top and bottom perforated screens 206 can be configured to have different sized holes, e.g., in which the bottom screen includes holes smaller than that of the top screen. The charge pieces 203 can include bulk size pieces (e.g., having ~2 cm diameter), which are disposed on the top perforated screen 206 such that they are capable of making contact with the exposed region of the electrodes 204. For example, the electrodes 204 can also be formed of the same material of interest as the charge pieces 203. The spark erosion cell can be vibrated by the gyrator 211 such that the charge pieces 203 can be moved around within the container to make an electrical contact with the electrodes 204, e.g., in which the electrical contact between them is continuously made and broken.

An electric field can be generated between the electrode 204 and the charge piece 203 in the dielectric fluid 202 using an electric pulse generated by the pulse power supply 205, in which the electric field creates a microplasma (spark) in a volume formed in a gap existing between the charge piece 203 and the electrode 204 that locally superheats the materials to form structures within the volume, e.g., in which the formed structures are condensed/quenched by the dielectric fluid 202 to produce the spark eroded nanoparticles 207. For example, microplasmas (sparks) can be generated in these exemplary gaps, e.g., when the electric field in a gap is greater than the breakdown field of the dielectric. The generated microplasmas exhibit high temperatures that provide localized heat to the charge pieces 203. For example, since the spark temperatures are very high (e.g., ~10,000 K), localized regions across the gaps are superheated by absorbing energy from the sparks (e.g., as shown in inset illustration 280). For example, when the spark collapses, tiny particles (e.g., molten droplets and/or vaporized material which can be of a nanometer size) can be ejected into the dielectric, e.g., in which the tiny structures are rapidly quenched/condensed to form solid spark eroded particles 207.

Figure 2B:
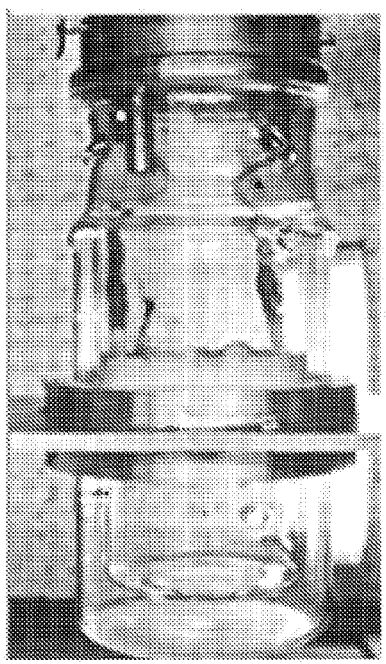
FIGS. 2B and 2C show images of an exemplary spark erosion device and an exemplary spark erosion cell, respectively.
Figure 2C:
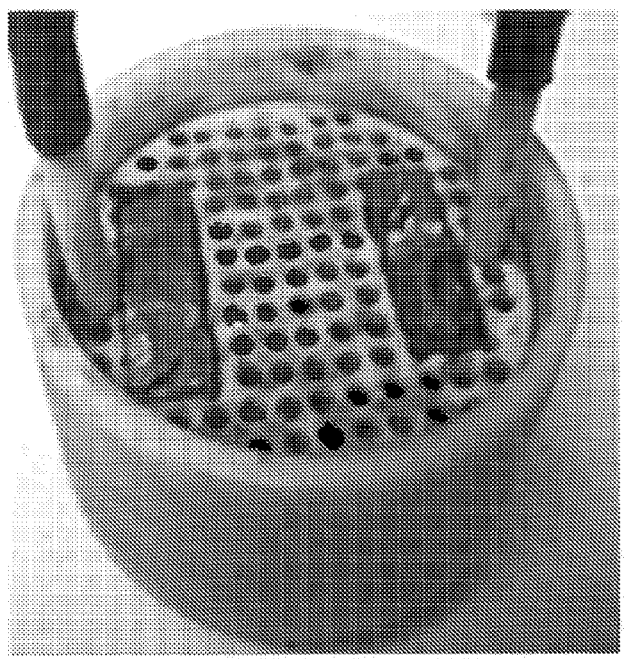

FIG. 2B shows an image of an exemplary 'shaker-pot' spark erosion device including the embodiment described for the spark erosion device 200. FIG. 2C shows an image of an exemplary spark erosion cell, e.g., having a 10 cm diameter, showing the insulated electrode connections to a pulsed power source and the perforated screen to support charge pieces.

Figure 3A:
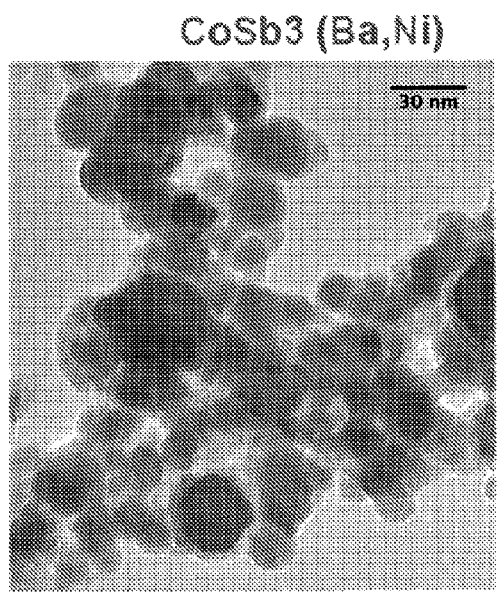
FIGS. 3A-3C show transmission electron microscopy (TEM) images of exemplary spark eroded nanoparticles.
Figure 3B:
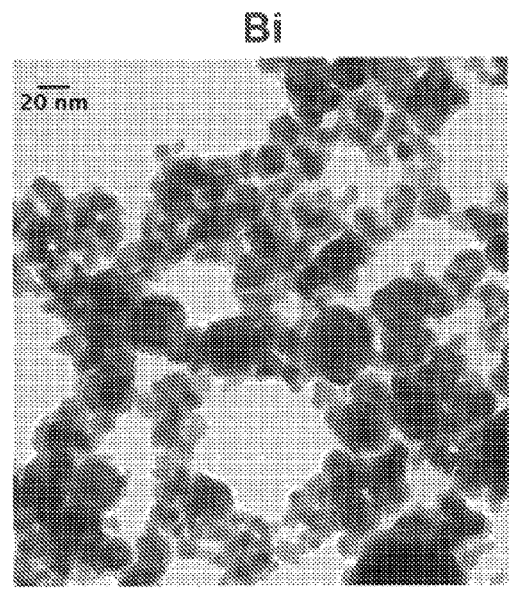
Figure 3C:
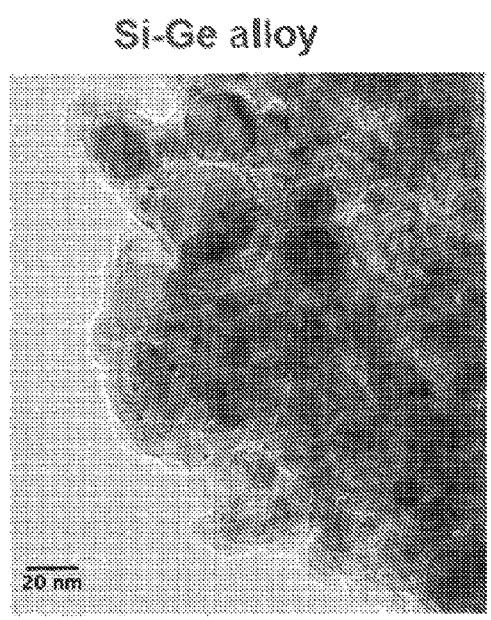

FIGS. 3A-3C show transmission electron microscopy (TEM) images of exemplary spark eroded nanoparticles having a diameter of 50 nm or less fabricated using the described spark erosion synthesis devices and techniques. FIG. 3A shows a TEM micrograph of $CoSb_3(Ba,Ni)$ skutterudite alloy spark eroded nanoparticles, which can be utilized as thermoelectric material. FIG. 3B shows a TEM micrograph of semi-metallic Bi spark eroded nanoparticles. FIG. 3C shows a TEM micrograph of Si—Ge semiconductor alloy spark eroded nanoparticles. For example, in these exemplary implementations, the spark erosion processes were conducted in a liquid nitrogen dielectric medium at a sparking capacitance of 122 µF and a voltage of 150V. The oxygen content of the spark eroded nanoparticles can be less than 1 wt %, and in some examples less than 0.5 wt % or even 0.2 wt %.

The disclosed spark erosion technology can be implemented to produce thermoelectric alloy nanostructures, magnetic alloy nanostructures, and nanocomposite alloy structures with engineered and enhanced properties that can be employed in various applications. For example, in the case of thermoelectric materials, a large figure of merit is important for efficient functionality of the thermoelectric material. The figure of merit, ZT, is expressed as $ZT=S^2\sigma T/k$ where S is the Seebeck coefficient, σ is the electrical conductivity, T is the absolute temperature, and k is the thermal conductivity. Higher ZT values can be obtained with reduced thermal conductivity (k), e.g., in which a reduced dimension of thermoelectric materials are preferred, which reduces the lattice thermal conductivity. According to the disclosed technology, the spark erosion processing produces thermoelectric nanoparticles with a size less than 100 nm, e.g., particularly less than 50 nm, and in some implementations less than 30 nm average diameter, which results in significantly improved thermoelectric properties, e.g., an enhanced figure of merit. For example, the thermal conductivity of the thermoelectric metals, alloys, semiconductors and compounds can be reduced by utilizing small grain size or small nanoparticles for enhanced phonon scattering. The disclosed spark erosion technology can be implemented to produce thermoelectric alloy nanostructures with small grain size or small nanoparticles, e.g., including, but not limited to, Si, Si—Ge, Bi, $B_4C/B_9C$, PbTe, Mg—Si, Mg—Ge, Mg—Sn or their ternary systems, binary, ternary or quarternary skutterudites (e.g., $CeFeCoSb_3$, $LaFe_4Sb_{12}$, $BaFe_4Sb_{12}$, $Ba_3Ni_{0.05}Co_{3.95}Sb_{12}$), lead-antimony-silver-tellurium Pb—Sb—Ag—Te (LAST) alloys.

Implementations of the disclosed spark erosion device can result in a high production rate for synthesis of metallic nanoparticles, e.g., which enables continuous synthesis of metallic nanoparticles. The disclosed spark erosion device can include the following rate-increasing mechanisms and features. For example, in some implementations, a chamber formed in a spark erosion apparatus can facilitate an array of rotatable/replaceable spark erosion cells (e.g., a shaker pot array) for continual spark eroding operations.

Figure 4:
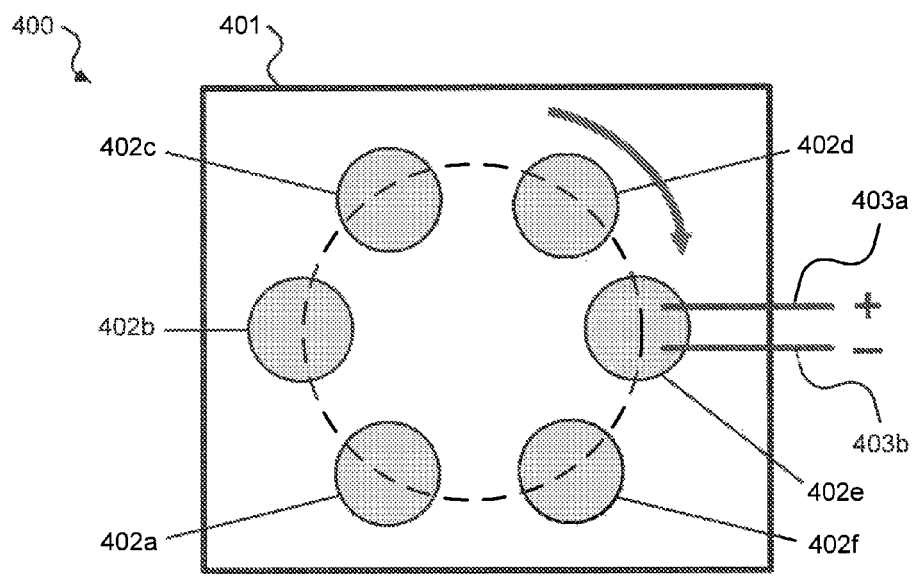
FIG. 4 shows a schematic of an exemplary rotatable/replaceable spark erosion cell array device.

FIG. 4 shows an exemplary rotatable/replaceable spark erosion cell array device 400 for continual spark eroding operations. The device 400 includes a chamber structure 401 that contains multiple spark erosion cells, e.g., represented by six spark erosion cells 402a-402f in this exemplary implementation, which can be rotated to a position that interfaces with an electrical energy source (e.g., an electrical pulsed power source). For example, the exemplary spark erosion cells 402a-402f can include the spark erosion cell 100 or other exemplary spark erosion cells described in this patent document. In some implementations, the electrical energy source can be configured as a charged capacitor or capacitance source. The exemplary electrical pulse power source can include a positive terminal 403a and a negative terminal 403b. The device 400 can include a rotator mechanism, e.g., located at the top or bottom of the chamber 401, that the spark erosion cells 402a-402f to rotate each cell to a position that forms an electrical connection with the electrical pulse power source, e.g., aligning the positive lead of the spark erosion cell with the positive terminal 403a of the pulse power source and the negative lead of the spark erosion cell with the negative terminal 403b of the pulse power source. For example, the rotator mechanism can rotate out a previously sparked cell from the electrical connection with the electrical pulse power source, e.g., after which the sparked cell can be rotated to a position for retrieval of the spark eroded nanoparticles and replenishment of the charge pieces while the next (newly rotated) spark erosion cell in electrical connection with the electrical pulse power source is subjected to spark erosion process.

Figure 5:
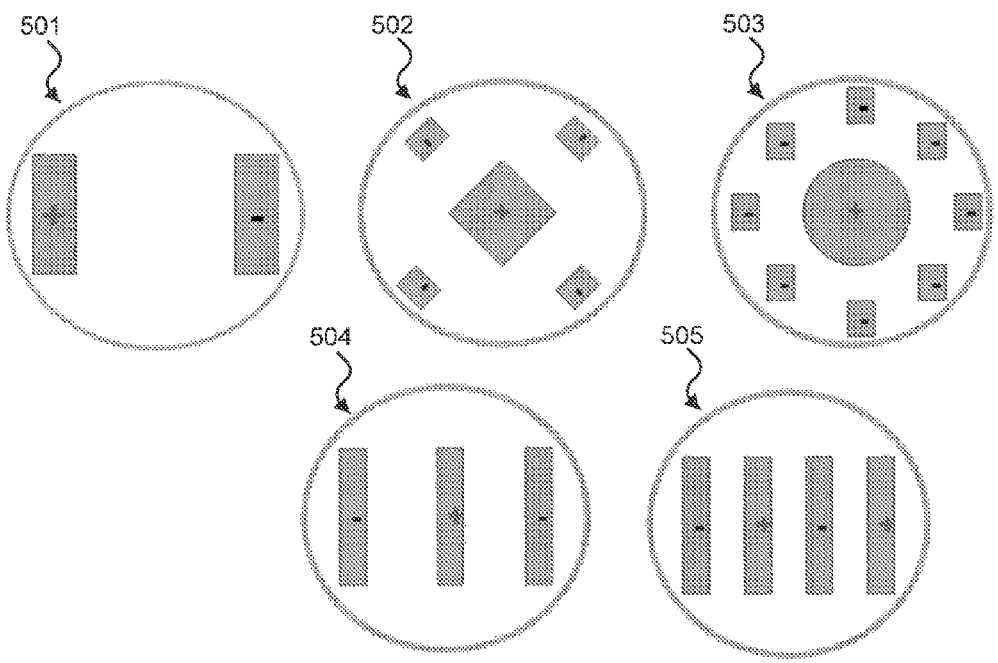
FIG. 5 shows diagrams illustrating exemplary spark erosion electrode configurations within a spark erosion cell.

For example, in some implementations, a spark erosion manufacturing cell can be made to contain multiple electrodes so that the sparking can occur more uniformly at many different locations. FIG. 5 shows diagrams illustrating exemplary spark erosion electrode configurations within a spark erosion cell. As shown in FIG. 5, a spark erosion cell 501 can include one pair spark erosion electrodes arranged at opposite ends of the cell, e.g., similar to the exemplary spark erosion cells previously shown in FIGS. 1A and 2A. Other electrode configurations including multiple electrodes made of spark-erodable material in parallel or circular configurations and/or of varying geometries within a spark erosion cell are shown in FIG. 5, e.g., which can enhance the uniformity of spark erosion activities at the increased number of local discharge contact points in the reaction chamber. For example, a spark erosion cell 502 and 503 can include multiple negatively charged spark erosion electrodes arranged on the periphery of the cell around a positively charged electrode located at the center of the cell. For example, the spark erosion cell 502 includes four negatively charged spark erosion electrodes arranged around the positively charged electrode, e.g., in which the electrodes include a rectangular or square geometry. For example, the spark erosion cell 503 includes eight negatively charged spark erosion electrodes arranged around the positively charged electrode, e.g., in which the electrodes include a circular geometry. For example, a spark erosion cell 504 can include two negatively charged spark erosion electrodes arranged on the opposite ends of the cell around a positively charged central electrode, e.g., in which the electrodes include a rectangular shape. For example, a spark erosion cell 505 can include multiple pairs of positively and negatively charged spark erosion electrodes arranged in one or more rows within the spark erosion cell, e.g., in which the electrodes include a rectangular shape. The exemplary alternative designs of spark erosion cells 502-505 can provide higher speed of spark erosion by supplying current more uniformly and over larger volume in the dielectric liquid.

Figure 6:
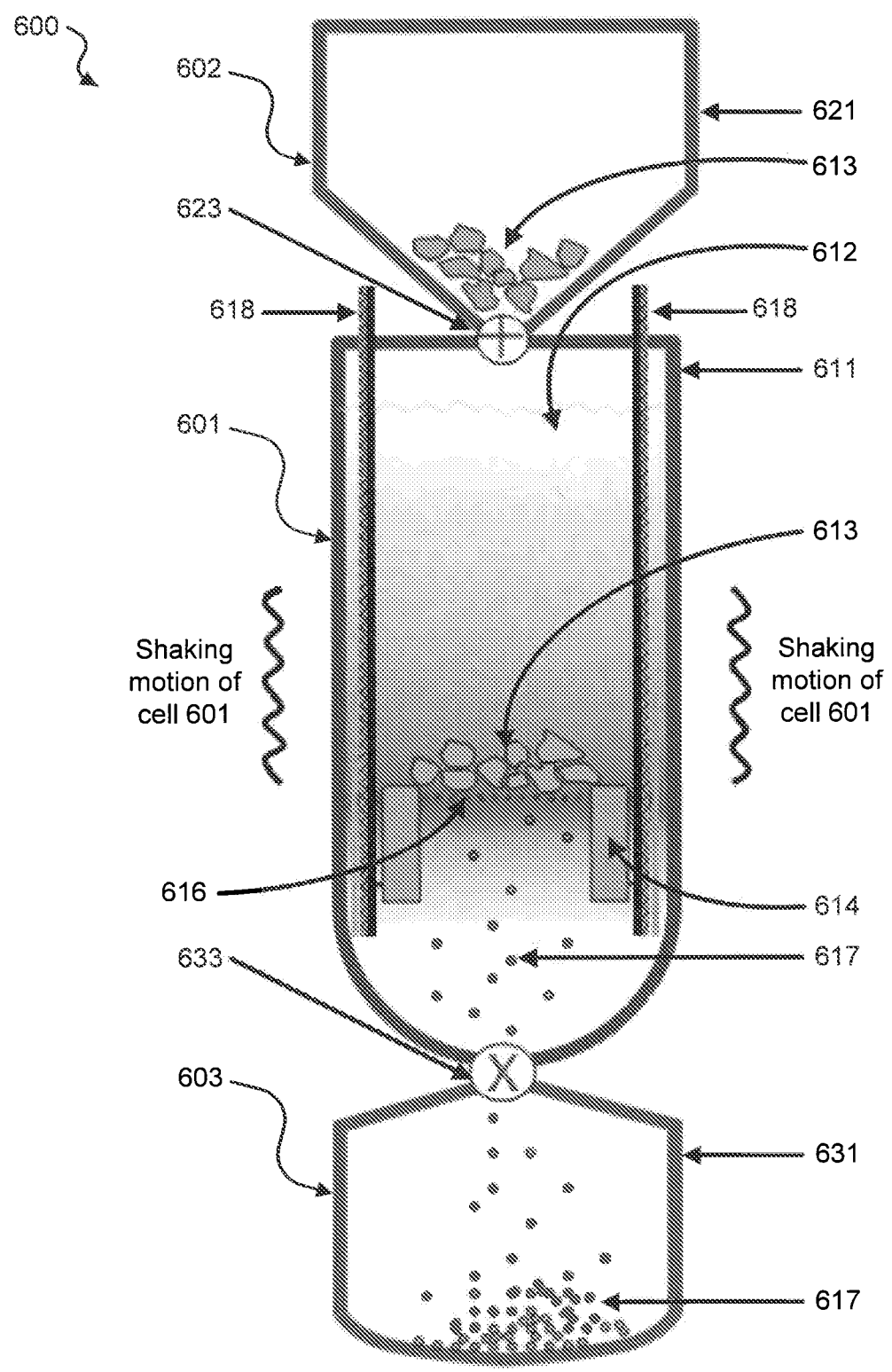
FIG. 6 shows a schematic of an exemplary spark erosion device having a feeding hopper to provide continuous or continual feeding of charge pieces to the spark erosion cell and a separable spark-eroded nanoparticle collection chamber.

For example, in some implementations, a spark erosion device can include a valve-controlled continuous or continual feeding of spark charge feedstock pieces, which can optionally be in combination with valve-controlled continuous or continual collection of the spark eroded nanoparticles, e.g., to increase production rate and throughput. FIG. 6 shows a schematic of a spark erosion device 600 having a feeding hopper to provide continuous or continual feeding of charge pieces to the spark erosion cell and a separable spark-eroded nanoparticle collection chamber. The exemplary spark erosion device 600 includes a charge materials storage chamber 602 that can store charge pieces 613 prior to their use in the spark erosion process. The charge materials storage chamber 602 includes a storage container 621 that can be coupled to a spark erosion cell 601 of the spark erosion device 600 via rotary valve 623 configured between an aperture of the charge piece materials storage container 621 and a loading aperture of the spark erosion cell 601. Charge pieces 613 can be contained within the storage container 621 and introduced into the spark erosion cell 601 via movement of the rotary valve 623. For example, the charge materials storage chamber 602 can be arranged on top of the spark erosion cell 601 such that the charge pieces 613 can descend into the spark erosion cell 601 when the rotary valve 623 is opened.

The spark erosion cell 601 includes a container 611 containing a dielectric medium 612, e.g., including an oxygen-free dielectric fluid such as liquid nitrogen or liquid argon. The spark erosion cell 601 includes electrodes 614 immersed within the dielectric medium 612 and in electrical connection to an electrical pulsed power source via insulated electrode lead wires 618. The spark erosion cell 601 includes a perforated screen 616 configured within the container 611 and structured to expose a region of the electrodes 614 through the top surface of the perforated screen 616. In some implementations, the spark erosion cell 601 can include a frame structure that can be loaded and unloaded in the container 611, or, in other implementations, the container 611 can function as the frame structure to provide positioning and/or structural support to the various components and/or modules of the spark erosion cell 601. The spark erosion cell 601 can be configured in a shaker-pot configuration that can be moved (e.g., vibrated, rotated, or shaken) to enable the charge pieces 613 and electrodes 614 to come in close contact via the mechanical perturbations on the cell 601. An electric field can be generated between the electrode 614 and the charge piece 613 in the dielectric medium 612 using an electric pulse generated by the electrical pulse power supply, in which the electric field creates a microplasma (spark) in a volume formed in a gap existing between the charge piece 613 and the electrode 614 that locally superheats the materials to form tiny structures (e.g., molten droplets and/or vaporized material which can be of a nanometer size) within the volume. The exemplary generated microplasmas exhibit high temperatures that provide localized heat to the charge pieces 613. When the spark collapses, the formed structures are ejected into the dielectric medium and rapidly quenched/condensed, in which the in situ quenching of the exemplary droplets or condensed vapor can produce spark eroded nanoparticles 617 having a substantially non-oxidized outer surface and amorphous or nanocrystalline structure, e.g., including spherical particle geometries. These exemplary spark eroded nanoparticles 617 can pass through the perforated screen 616 toward an end of the container 611 (e.g., the bottom of the container).

The exemplary spark erosion device 600 includes a collection chamber 603 that can store the produced spark eroded nanoparticles 617. The collection chamber 603 includes a container 631 that can be coupled to the spark erosion cell 601 via a rotary valve 633 configured between an aperture of the collection chamber 603 and an exit aperture of the spark erosion cell 601. The spark eroded nanoparticles 617 can be removed from the spark erosion cell 601 and introduced into the collection chamber 603 via movement of the rotary valve 633. For example, the spark erosion cell 601 can be arranged on top of the collection chamber 603 such that the spark eroded nanoparticles 617 can descend into the collection chamber 603 when the rotary valve 633 is opened. For example, the collection chamber 603 containing the spark eroded nanoparticles 617 can be detached from the spark erosion cell 601 and brought into an enclosed glove box or other enclosure having an inert atmosphere. For example, any dielectric medium 612 (e.g., liquid nitrogen or liquid argon) collected in the collection chamber 603 can be permitted to evaporate. The nanoparticles can then be further processed, if desired for example, for separation of the spark eroded particles 617 into different size groups, e.g., by sieving, gravitational separation or centrifugal separation. These processing steps can be conducted in an inert atmosphere to inhibit surface oxidation of the nanoparticles.

Figure 7A:
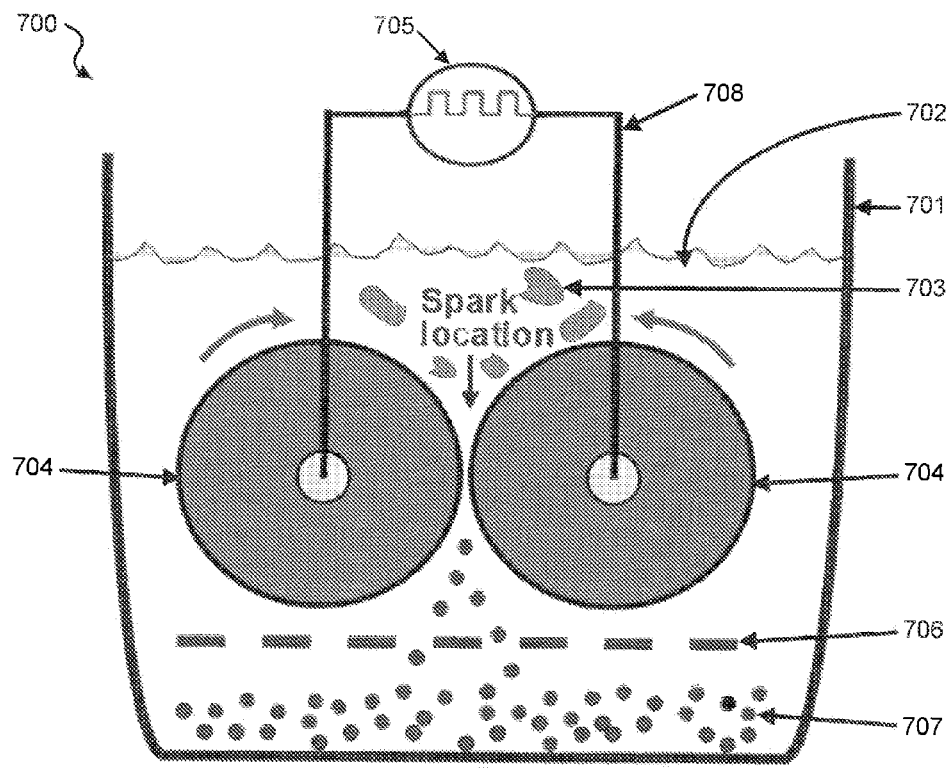
FIGS. 7A-7C show schematics of an exemplary rotating disk spark erosion device and various exemplary configurations of the rotating sparking disks.
Figure 7B:
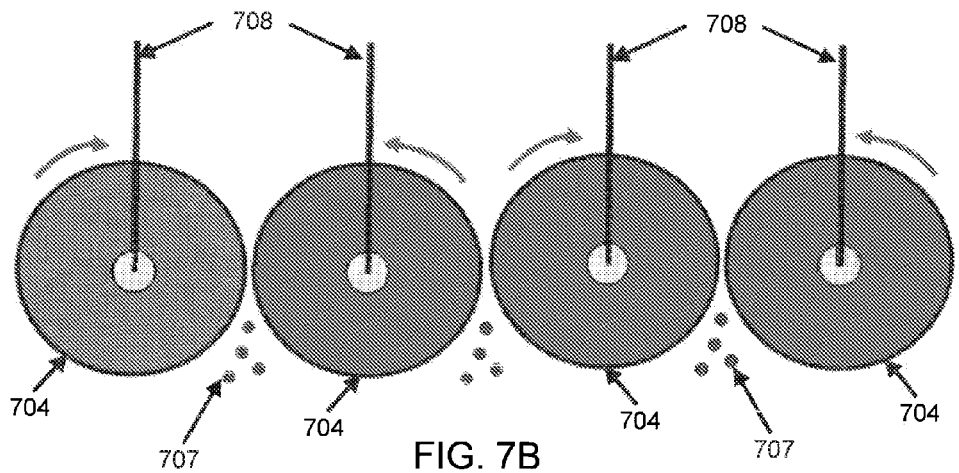
Figure 7C:
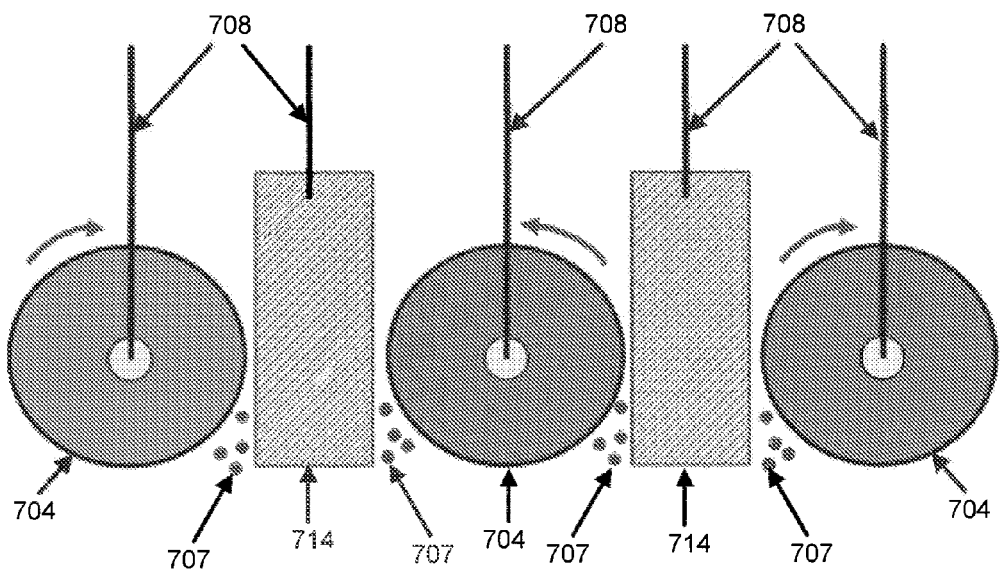

In some implementations, a spark erosion device can include a spark erosion mechanism using rotating disk electrodes that allow frequent sparking at a substantially constant gap. FIGS. 7A-7C show schematics of an exemplary rotating disk spark erosion device and various exemplary configurations of the rotating sparking disks. FIG. 7A shows a schematic of a rotating disk spark erosion device 700. In this exemplary configuration, the rotating disk spark erosion device 700 includes one pair of rotating sparking disks 704 that are separated from each other but are adjacent to each other to provide a gap in between where the spark erosion process occurs. The rotating sparking disks 704 can be configured as rotating cylinders to increase the overall sparking surface area. The rotating sparking disks 704 are controlled to rotate in opposite directions to bring the charge pieces 703 towards the gap between the rotating sparking disks 704 where the charge pieces 703 are locally heated by the spark-caused plasma to form tiny structures. The rotating disk spark erosion device 700 uses a controlled, high frequency pulse current generated by an electric discharge machine power supply 705, in which the pulse amplitude, pulse duration, and/or pulse frequency can be controlled. The rotating disk spark erosion device 700 includes a container 701 containing a dielectric medium 702, e.g., including an oxygen-free dielectric fluid such as liquid nitrogen or liquid argon. In some implementations, rotating disk spark erosion device 700 can include a frame structure that can be loaded and unloaded in the container 701, or, in other implementations, the container 701 can function as the frame structure to provide positioning and/or structural support to the various components and/or modules of the rotating disk spark erosion device 700. The rotating disk spark erosion device 700 includes rotating sparking disks 704 immersed within the dielectric fluid 702 and in electrical connection to electric discharge machine power supply 705 via insulated electrode lead wires 708 which is electrically insulated from the dielectric fluid 702. The rotating disk spark erosion device 700 includes a perforated screen 706 configured within the container 701 that prevents charge pieces 703 passing through while permitting the produced spark eroded nanoparticles 707 to pass through to a collection region of the container 701. A microplasma (spark) in a volume formed between the charge pieces 703 and the rotating sparking disks 704 within the dielectric medium 702 based on high frequency pulse current generated by an electric discharge machine power supply 705. For example, the material that forms the charge pieces 703 can also be the same material used as the rotating sparking disks 704. The spark locally superheats the material to form tiny structures (e.g., molten droplets and/or vaporized material which can be of a nanometer size) within the volume. The exemplary generated microplasmas exhibit high temperatures that provide localized heat to the charge pieces 703. When the spark collapses, the formed structures are ejected into the dielectric fluid 703 and are rapidly quenched/condensed, in which the in situ quenching of the exemplary droplets or condensed vapor can produce spark eroded nanoparticles 707 that have a substantially non-oxidized outer surface and amorphous or nanocrystalline structure, e.g., including spherical particle geometries. These exemplary spark eroded nanoparticles 707 can pass through the perforated screen 706 toward an end of the container 701 (e.g., the bottom of the container). For example, the described rotating disk spark erosion device configuration can utilize less power and produce more frequent sparking than the disclosed shaker pot spark erosion configurations, e.g., in which, in some implementations, the disclosed shaker pot spark erosion configurations may use large magnitude electrical currents, e.g., such as ~1000 amperes and operate by stochastic pulsing from capacitance discharge controlled by 20-70 Hz vibrational contacts.

For example, the rotating disks 704 can be configured as one pair rotating disks (e.g., in which either one or both disks are rotating at high speed), as a series of rotating disks (e.g., in which all or alternating disks are rotating), or as a combination of rotating disks and/or stationary flat electrodes. FIG. 7B shows a schematic of another exemplary configuration of multiple rotating sparking disk pairs, and FIG. 7C shows an exemplary configuration of multiple sparking rotating disks interfaced with multiple stationary electrode plates.

In another aspect of the disclosed technology, nanocomposite structured materials can be formed using the described spark erosion processes.

In some implementations, the disclosed spark erosion technology can produce surface decorated nanoparticles for nanograined consolidation sintering to create nanocomposite structured materials. For example, separate alloy nanoparticles can be produced using the described spark erosions systems, devices, and methods and subsequently mixed, followed by compaction and sintering to consolidate the particles into a composite material. Exemplary spark eroded nanocomposite materials can be particularly useful in energy-related applications in which strong permanent magnets are desired for efficient operation of electric motors, for example, in electric vehicles wholly or partially powered by batteries or supercapacitors. Implementations of the disclosed technology can produce permanent magnets that include Nd—Fe—B magnets further enhanced by addition of more expensive rare earth elements, e.g., such as Dy. For example, the disclosed spark erosion techniques can produce both Nd—Fe—B magnet alloy nanoparticles (e.g., less than 100 nm, and in some examples, less than 50 nm) and Dy or Dy-containing alloy nanoparticles of comparably or smaller size that are substantially free of surface oxide. Rare earth elements are the most reactive group of elements in the periodic table, which are much easier to oxidize than, for example, Ti or Al. According to the disclosed technology, by spark eroding at low temperatures such as at below minus 100° C. using a spark erosion dielectric medium such as liquid argon or liquid nitrogen, these rare earth alloy nanoparticles can be produced free of surface oxide.

In some implementations, spark eroded hard magnetic nanoparticles and other spark eroded nanoparticles can be fabricated based on materials, processes, devices, and systems described in the PCT Patent Application No. PCT/US2012/038728 entitled "NANOSTRUCTURED HIGH-STRENGTH PERMANENT MAGNETS", which is incorporated by reference as part of the disclosure of this patent document.

Figure 8:
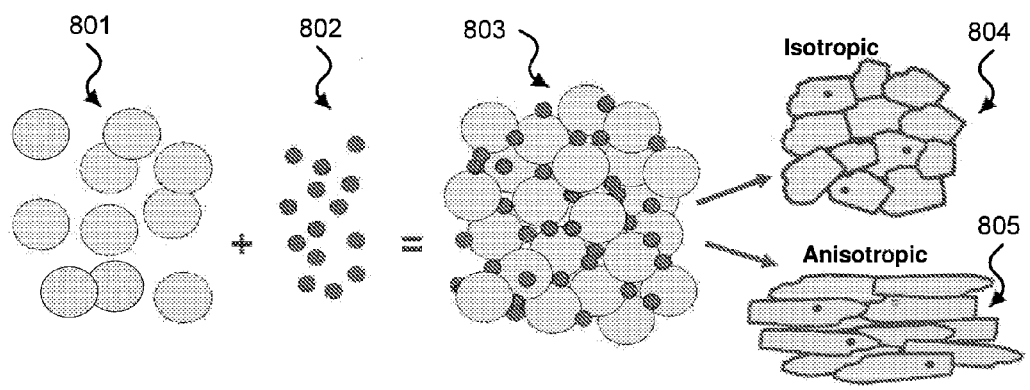
FIG. 8 shows a diagram demonstrating the mixing of two separately spark eroded nanoparticles and consolidation by sintering and/or uniaxial deformation.

FIG. 8 shows a diagram demonstrating the mixing of two separately spark eroded nanoparticles and consolidation by sintering and/or uniaxial deformation to form nanocomposite structured materials. In some examples, hard magnet nanoparticles and soft magnet nanoparticles can be formed by combining the described nanoparticle spark erosion processes and short-distance diffusional sintering of the hard magnet and soft magnet nanoparticles (or grain boundary barrier material (e.g., domain wall pinning phase nanoparticles) to increase the magnet performance of the formed nanocomposite magnetic material. In some examples, the spark eroded hard magnetic nanoparticles and other spark eroded nanoparticles shown in FIG. 8 are based on spark erosion cells described in this patent document, e.g., to fabricate multiple phased magnetic nanomaterials.

For example, spark eroded Nd—Fe—B magnet nanoparticles 801 (e.g., high strength Nd—Fe—B magnets) can be mixed with other nanoparticles 802, for example, which can include spark eroded Dy (or Dy-rich alloy) nanoparticles or grain boundary barrier material nanoparticles (e.g., domain wall movement blocking materials and including Cu, Ag, Zn, Si, Sn, Sb, Bi, Mg, Al, other transition metals, rare earth and their alloys including soft magnetic metals and alloys). The mixed nanoparticles can form a nanocomposite two phase structure 803 which can be hard magnet grains decorated with nonmagnetic nanoparticles selected from the materials described above. In some implementations, the nanocomposite two phase structure 803 can include hard magnet grains decorated with soft magnet smaller nanoparticles. The exemplary magnetic/nonmagnetic nanocomposite two phase structure or hard magnet/soft magnet nanocomposite two phase structure 803 can be compacted for sintering (e.g., in a reducing atmosphere), which can form sintered and diffusion mixed Nd—Dy—Fe—B alloy nanoparticles 804 (isotropic nanoparticles) and/or 805 (anisotropic nanoparticles), e.g., with grain boundary and interior decoration. For example, the pressed and diffusionally-sintered mix of spark eroded Nd—Fe—B magnet nanoparticles 801 and spark eroded Dy nanoparticles 802 can form a unique microstructure of Dy-doped Nd—Fe—B magnets having superior magnetic properties. For example, if the second phase smaller particles can be of materials including, but not limited to, Cu, Ag, Zn, Si, Sn, Sb, Bi, Mg, Al, or their alloys having a relatively low melting temperature, these metals or alloys can diffuse along the grain boundaries of the hard magnet grains to form a grain boundary decorated and domain-wall motion impeding structure of 804 or 805. For example, since the grain boundaries offer faster diffusion path at low temperatures, the uniform nanoscale distribution of Dy (or Dy-rich phase), or these low melting temperature, nonmagnetic metallic elements, or soft magnetic metallic layer at grain boundaries (and grain interior) can be obtained, which further enhances magnetic anisotropy and coercivity of the Nd—Fe—B magnets. For example, because of the short diffusion distance required from Dy nanoparticles in the nanocomposite of FIG. 8 (e.g., the Nd—Dy—Fe—B alloy isotropic nanoparticles 804 and/or anisotropic nanoparticles 805), the desired grain boundary decoration becomes much easier. The anisotropic, elongated structure of 805 can be obtained by pressing or uniaxial deformation, e.g., such as rolling, swaging, extrusion of the nanocomposite structure prior to the diffusional annealing to decorate the grain boundaries.

In another aspect, the disclosed technology includes the utilization of two different size spark eroded nanoparticles, e.g., including a first set of larger particles coated or decorated with a second set of smaller size particles. The smaller nanoparticles can be spark eroded nanoparticles or nanoparticles prepared by other synthesis method, e.g., such as chemical precipitation or mechanical grinding. When the spark erosion synthesized nanoparticles are mixed with foreign nanoparticles of ceramic or metallic nanoparticles, and then consolidated/sintered rapidly so as to prevent coarsening, a smaller size nano-grained base alloy structure can be obtained due to the grain growth inhibition by the second phase nanoparticles during sintering.

Figure 9:
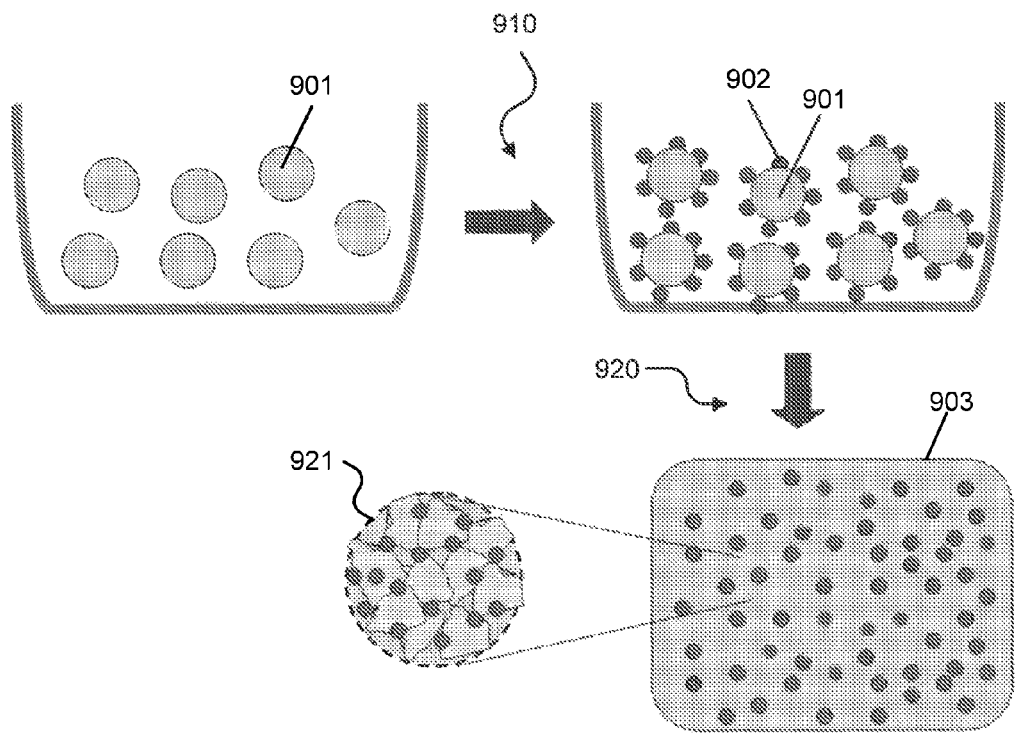
FIG. 9 shows an exemplary process to fabricate nanocomposite materials using spark eroded nanoparticles as the base particles.

FIG. 9 shows a schematic of an exemplary process to fabricate nanocomposite materials using spark eroded nanoparticles as the base particles. The process includes implementing the described spark erosion methods (e.g., such as the method 190) to produce spark eroded nanoparticles 901. The process includes a process 910 to coat the spark eroded nanoparticles 901 with smaller metallic or ceramic nanoparticles 902. For example, the spark eroded metallic nanoparticles 901 can be coated or decorated with metallic or ceramic nanoparticles 902 such as $TiO_2$, $SiO_2$, $Al_2O_3$, MgO, ZrO, $Fe_2O_3$, BaO, $Cr_2O_3$, $Y_2O_3$, MnO, CuO, rare earth oxide, AN, CeN, $Si_3N_4$, TiN, Ag, Au, Pd, Co, Fe, Ni, Mo, Ti, Al, Zr, Ta, Si, Ge, B, C, Mg, and rare earth. The process includes a process 920 to sinter the coated particles to produce a consolidated nanocomposite material 903. The nanoparticles 901 provide nano-grained base alloy particles for the nanocomposite material 903. For example, grain growth of the spark eroded nanoparticles 901 is inhibited during sintering by the nanoparticles 902, as shown in the exemplary illustration 921. The grain boundaries inhibited by the nanoparticles 902 in the nanocomposite material 903 can provided enhanced properties, e.g., such as phonon scattering, ductility, strength.

In some implementations, surface functionalization or mechanical mix and ligand/surfactant attachment may be employed to produce such particle-decorated nanocomposite structures. Once such nanocomposite structures are compacted and sintered, the consolidated alloy tends to exhibit a two-phase or multi-phase nanostructure containing second phase nanoparticles. For example, the nanocomposite structures 903 include at least 0.2 vol % of the second phase, e.g., and in some examples at least 2 vol % of the second phase, and exhibit decreased grain size by at least 20%, and in some examples by at least 40%. For example, the nanocomposite structures 903 can exhibit enhanced phonon scattering and reduced thermal conductivity by at least 20%, and in some examples by at least 40%, as well as enhanced mechanical strengths by at least 20%, and in some examples by at least 40%.

Figure 10:
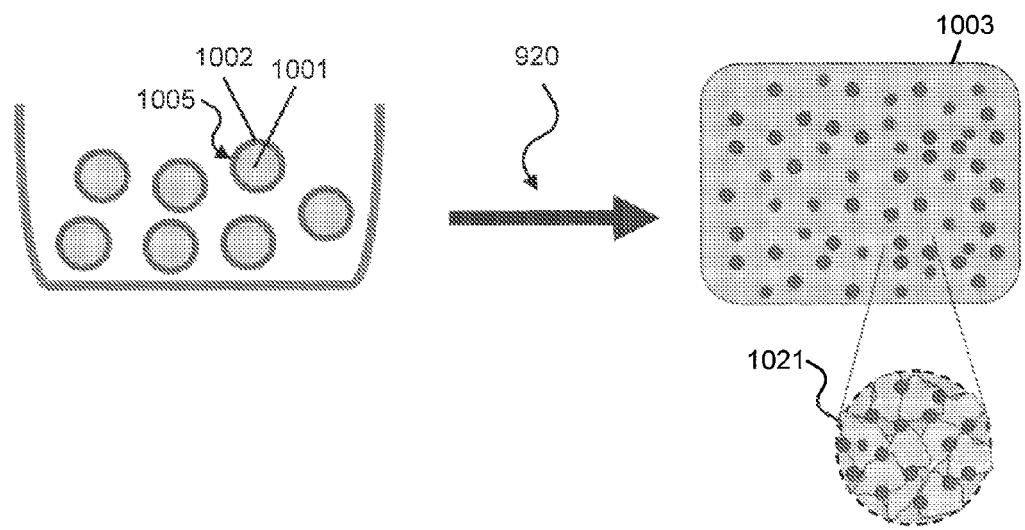
FIG. 10 shows a schematic of an exemplary process to fabricate nanocomposite materials using surface oxidized or surface nitrided spark eroded nanoparticles.

According to the disclosed technology, intentionally oxidized surfaces of the disclosed spark eroded alloy nanoparticles can be useful for microstructural modifications. FIG. 10 shows a schematic of an exemplary process to fabricate nanocomposite materials 1003 using nanoparticles 1005 with oxide or nitride surfaces formed from spark eroded nanoparticles 1001 with an intentionally oxidized surface 1002 to create nano-oxide inclusions after the sintering process 920. In one example, the spark erosion nanoparticle synthesis can be controlled so that a controlled surface oxidation occurs, e.g., either by using water or organic solutions at room temperature, using slightly oxygen containing dielectric liquid, or liquid oxygen itself, or exposing the synthesized nanoparticles to slightly oxygen-containing atmosphere such as air or oxygen-containing Ar gas. In another example, an alternative approach is to intentionally dope the spark erosion charge and electrode stock material with easily-oxidizable or easily-nitriding element such as Ti, Al, Zr, or rare earth metals, so that the spark eroded nanoparticles, upon controlled oxidation, create oxide shell of the easily-oxidizable element, e.g., including, but not limited to $TiO_2$, $Al_2O_3$, $ZrO_2$, or rare earth oxide, or TiN, AN, ZrN or rare earth-nitride. For example, when such a core-shell surface oxidized or surface nitrided nanoparticles 1005 are compacted and sintered (e.g., with optional mechanical deformation techniques such as attrition milling or plastic deformation within a metallic jacket prior to the consolidation annealing), the consolidated alloy can contain nano-fragments of oxide or nitride materials, which can produce nanograined structures of irregular shape or spheroidized shape (e.g., shown in the illustration 1021) with desired properties. For example, the nanocomposite structures 1003 can include at least 0.2 vol % of the second phase, e.g., and in some examples by at least 2 vol % of the second phase, and can exhibit decreased grain sizes by at least 20%, e.g., and in some examples by at least 40%. For example, the nanocomposite structures 1003 can exhibit enhanced phonon scattering and reduced thermal conductivity by at least 20%, and in some examples by at least 40%, as well as enhanced mechanical strengths by at least 20%, and in some examples by at least 40%.

In some implementations, the thickness of surface oxidation can be configured in the range of 0.1-20 nm, e.g., particularly in the range of 0.2-5 nm. The thickness of the oxide shell can be adjusted by the degree of intentionally allowed oxidation, or by the degree of reducing heat treatment using hydrogen of forming gas (e.g., 2-8% $H_2$ gas and the remainder $N_2$ gas) annealing at high temperatures, e.g., at 300-800° C. Such a thin oxide shell can be broken up during pressing, cold rolling or sintering consolidation. The resultant consolidated thermoelectric alloy contains oxide nano-phase material such as oxide nanoparticles useful for reducing grain size by at least 20%. Such reduced grain size results in enhanced phonon scattering and reduced thermal conductivity, as well as increased strengths and fracture toughness.

In another aspect, the disclosed technology can include the use of composite alloy electrodes or charge piece targets with an added component of ceramic or metallic materials, so that the spark eroded particles exhibit a two-phase or multi-phase nanostructure containing second phase nanoparticles.

Figure 11:
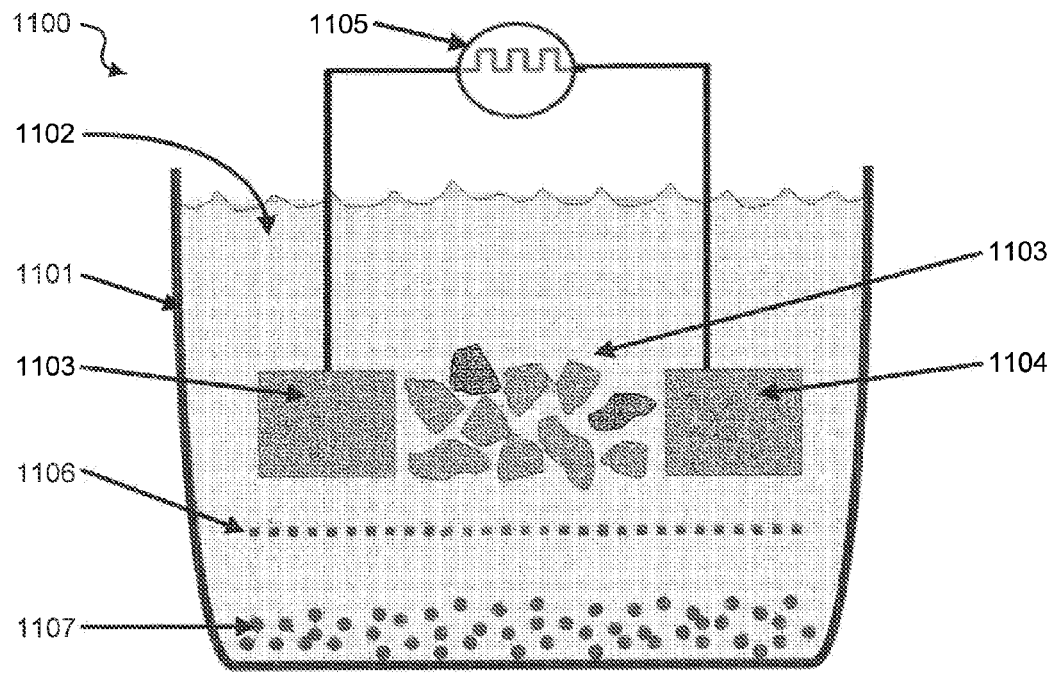
FIG. 11 shows a schematic of an exemplary spark erosion apparatus using composite electrodes and/or charge pieces including metallic or ceramic phases to produce nanocomposite structures.

FIG. 11 shows a schematic of an exemplary spark erosion apparatus 1100 using composite electrode and/or charge pieces containing metallic or ceramic phases to produce nanocomposite structures (e.g., including nanocomposite structured alloy powder). Spark erosion methods can be implemented using the apparatus 1100 to utilize composite electrode metal or alloy electrodes and/or charge pieces containing at least one other phase material, e.g., in which the alloy or metal electrodes and charge pieces are made to contain macro, micro or nanophase of other metals, alloys, compounds, oxides, nitrides, carbides and fluorides. For example, exemplary second phase materials can be selected from $TiO_2$, $SiO_2$, $Al_2O_3$, MgO, ZrO, $Fe_2O_3$, BaO, $Cr_2O_3$, $Y_2O_3$, MnO, CuO, rare earth oxide, MN, CeN, $Si_3N_4$, TiN, Ag, Au, Pd, Co, Fe, Ni, Mo, Ti, Al, Zr, Ta, Si, Ge, B, C, Mg, and rare earth. In such nanocomposite structures, the spark eroded particles exhibit a two-phase or multi-phase nanostructure containing second phase nanoparticles, e.g., either in the as-spark-eroded state or after a subsequent annealing step. When the capacitance is discharged and the sparking occurs with 10,000 K regime temperatures, not only the base alloy, but the metallic or ceramic inclusions in the electrode (or charge pieces) also vaporize and later condense in the dielectric medium together with the base alloy phase into nano or micro size spherical particles, e.g., leading to a nanocomposite structure within the spark eroded particles.

As shown in FIG. 11, the spark erosion apparatus 1100 can include a container 1101 that contains a dielectric fluid 1102, e.g., such as liquid $N_2$, liquid Ar, water, or dodecane type hydrocarbon liquid ($C_{12}H_{26}$). In some implementations, the spark erosion apparatus 1100 can include a frame structure that can be loaded and unloaded in the container 1101, or, in other implementations, the container 1101 can function as the frame structure to provide positioning and/or structural support to the various components and/or modules of the spark erosion apparatus 1100. The spark erosion apparatus 1100 can be configured in a shaker-pot configuration that can be moved (e.g., vibrated, rotated, or shaken) to enable composite bulk charge pieces 1103 and electrodes 1104 (e.g., with an added component of ceramic or metallic materials) to come in close contact via the mechanical perturbations. The spark erosion apparatus 1100 can include composite electrode 1104 in connection to a pulsed power source 1105, e.g., to implement a spark erosion process in an exemplary manner as previously described. For example, electric fields can be generated in the gaps existing among the composite electrode 1104 and the bulk charge pieces 1103. For example, as described previously, microplasmas (sparks) can be generated in these exemplary gaps, e.g., when the electric field in a gap is greater than the breakdown field of the dielectric. For example, when the spark collapses, tiny structures (e.g., in the form of molten droplets and/or vaporized material which can be of a nanoscale size) can be ejected into the dielectric, e.g., in which the tiny structures are rapidly quenched/condensed. In some configurations, the exemplary spark erosion apparatus 1100 can include vibrating mechanisms, e.g., by using a shaker-pot configuration, or in some examples, a rotating-electrodes configuration, as previously described. Implementations of the exemplary spark erosion apparatus 1100 can be performed to produce spark eroded nanocomposite structures 1107 that can be collected on the other side of a perforated screen 1106. For example, because of the second phase inclusions, grain growth is inhibited during spark erosion solidification as well as during subsequent sintering consolidation of spark eroded nanoparticles. Thus exemplary nanocomposite thermoelectric alloys can be fabricated from the composite spark erosion electrodes with decreased grain size. The exemplary nanocomposites can be configured to include at least 0.2 vol % of the second phase, and in some examples at least 2 vol % of the second phase; exhibit decreased nanograin size and increased grain boundary area by at least 20%, and in some examples by at least 40%; exhibit reduced thermal conductivity by at least 20%, and in some examples by at least 40%; and exhibit enhanced mechanical strengths by at least 20%, and in some examples by at least 40%.

In another aspect, the disclosed technology can include the use of nano-dispersoid type dielectric liquid which also contains metallic, semiconducting or ceramic nano-sized particles or a dissolved metallic or ceramic component within a dielectric liquid to produce spark eroded alloy nanoparticles that contain further nano-sized inclusions of the metallic or ceramic material.

Figure 12:
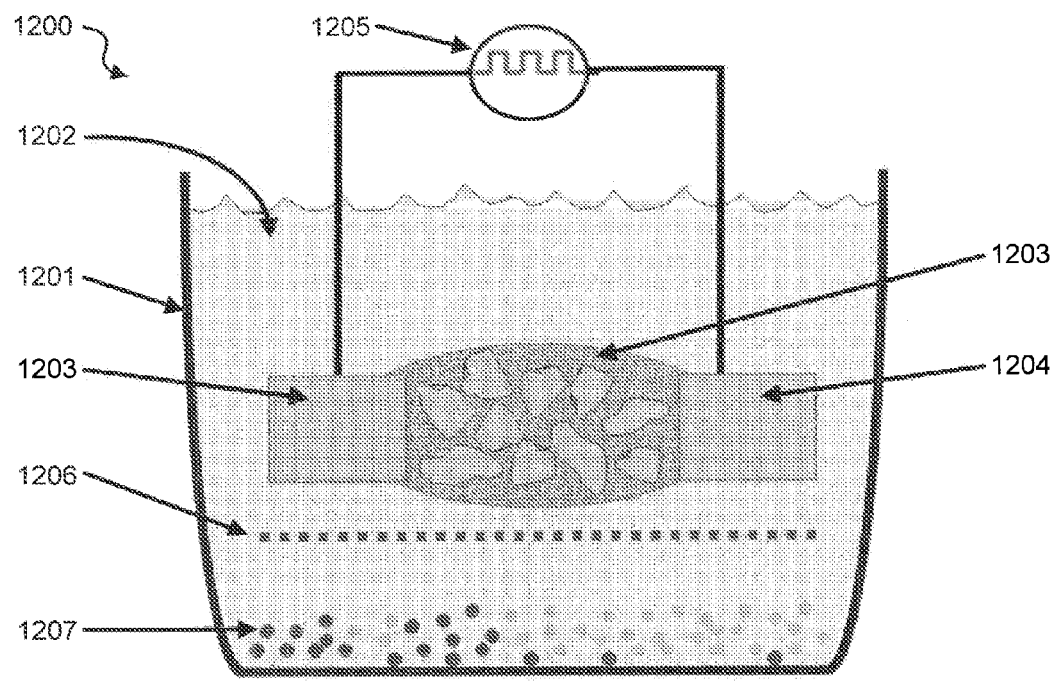
FIG. 12 shows a schematic of an exemplary spark erosion apparatus that uses a nano-dispersoid dielectric medium.

FIG. 12 shows a schematic illustration of a spark erosion apparatus 1200 that uses a nano-dispersoid dielectric medium containing metallic or precursor compound nanoparticles, dissolved salts, or dissolved cations or anions to produce nanocomposite structures during sparking (e.g., nanoscale structured alloy nanocomposite powder, which in some examples, can exhibit thermoelectric properties). For example, the spark eroded nanocomposite structures from nano-dispersoid dielectric liquid can include Bi—Sb—Te nanocomposite structures.

Such a nano-dispersoid containing dielectric medium can be made by mixing nanoparticles of $SiO_2$, $TiO_2$, $Al_2O_3$, MgO, $Si_3N_4$, MN, $CaF_2$, metallic particles such as Ag, Cu, Fe, Ni, Co, Cr, V, Zr, Hf, dissolved metal cations such as Na, Al, K, Mg, Fe, Ni, Co, Cr, V, Zr, Hf, and anions such as Cl, $NO_3$, F into a medium such as liquid $N_2$, liquid Ar, water, ethylacetate, dodecane. An example of a desired concentration of the nanoparticle dispersoid can range between 0.1-10 volume %, e.g., particularly 0.2-5%. An example of a desired size of the nanoparticle dispersoid can range between 0.5-50 nm, e.g. particularly 1-20 nm.

As shown in FIG. 12, the spark erosion apparatus 1200 can include a container 1201 that contains a nano-dispersoid dielectric fluid 1202, e.g., such as liquid $N_2$, liquid Ar, water, or dodecane type hydrocarbon liquid ($C_{12}H_{26}$). The exemplary nano-dispersoid dielectric fluid 1202 includes dispersed compounds or substances with bulk charge pieces 1203. For example, the dispersed substances can behave as spacer particles, and can be configured as nanoparticles such as magnetic domain wall pinning nanoparticles, metallic or precursor compound nanoparticles, dissolved salts, or dissolved ions (e.g., which can be of a nonmagnetic or soft magnetic material). In some implementations, the spark erosion apparatus 1200 can include a frame structure that can be loaded and unloaded in the container 1201, or, in other implementations, the container 1201 can function as the frame structure to provide positioning and/or structural support to the various components and/or modules of the spark erosion apparatus 1200. The spark erosion apparatus 1200 can be configured in a shaker-pot configuration that can be moved (e.g., vibrated, rotated, or shaken) to enable the bulk charge pieces 1203 and electrodes 1204 to come in close contact via the mechanical perturbations. The spark erosion apparatus 1200 can include electrodes 1204 in connection to a pulsed power source 1205, e.g., to implement a spark erosion process in an exemplary manner as previously described. For example, electric fields can be generated in the gaps existing among the electrodes 1204 and the bulk charge pieces 1203, in which the spacer particles produce nanocomposite structured alloy particles during sparking. For example, as described previously, microplasmas (sparks) can be generated in these exemplary gaps, e.g., when the electric field in a gap is greater than the breakdown field of the dielectric. For example, when the spark collapses, tiny structures (e.g., in the form of molten droplets and/or vaporized material which can be of a nanoscale size) can be ejected into the dielectric, e.g., in which the tiny structures are rapidly quenched/condensed. In some configurations, the exemplary spark erosion apparatus 1200 can include vibrating mechanisms, e.g., by using a shaker-pot configuration, or in some examples, a rotating-electrodes configuration, as previously described. For example, the exemplary metallic or precursor compound nanoparticles, dissolved salts, or dissolved ions of nonmagnetic materials or soft magnetic materials, which can be referred to as spacer particles (e.g., spacer nanoparticles) can be introduced into the nano-dispersoid dielectric fluid 1202 and enable the exemplary charge pieces 1203 to come closer to the exemplary shaker pot electrodes 1204, e.g., by mechanical vibrations such as the movement of the container 1201 or rotation of the electrodes 1204, which form the nanocomposite structured alloy particles 1207 during sparking. Implementations of the exemplary spark erosion apparatus 1200 can be performed to produce spark eroded nanocomposite structures 1207 that can be collected on the other side of a perforated screen 1206. For example, the resultant alloy nanocomposite consolidated from the spark eroded alloy using composite dielectric liquid can exhibit a decreased nanograin size and increased grain boundary area by at least 20%, e.g., and in some examples by at least 40%; reduced thermal conductivity by at least 20%, e.g., and in some examples by at least 40%; and enhanced mechanical strengths and ductility by at least 20%, e.g., and in some examples by at least 40%.

In another aspect, the disclosed technology can produce hollow sphere nanoparticles (nanospheres) with reduced density and increased surface area.

The selection of certain dielectric liquid can affect the process to produce hollow nanospheres. For example, the nanograin width dimension can be limited by the hollow sphere shell thickness, therefore, much smaller grain size is obtainable, e.g., when the hollow particles are consolidated by thermal sintering, hot pressing under pressure, or spark plasma sintering, with decreased nanograin size and increased grain boundary area by at least 20%, e.g., particularly by at least 40%; reduced thermal conductivity by at least 20%, e.g., particularly by at least 40%; and enhanced mechanical strengths by at least 20%, e.g., particularly by at least 40%. Such hollow spheres can be broken up to produce ultra-nanograin material. For example, since the interior of the hollow sphere is unoxidized, a reactive or explosive material can be prepared, e.g., by using Ti, Al, Zr, Si hollow spheres aggregates. For example, upon impact deformation and/or puncturing of these exemplary hollow spheres, the unoxidized interior wall rapidly oxidizes in exposure to air and can result in explosive reactions. Such hollow spheres can be useful for ignition or explosive applications.

In another aspect, the disclosed technology includes systems, devices, and methods for spark erosion to fabricate silicon-based nanoparticles.

Silicon (Si) is a semiconductor material useful for a variety of high-tech device applications including semiconductor devices, MEMS (micro electro mechanical systems) devices, photovoltaic solar cells, and battery electrodes, among other technologies. Si-based nanoparticles can be useful for newer, specialized applications such as energetic uses and quantum confinement applications.

For energetics applications that utilize rapid chemical reactions, Si nanoparticles can offer advantages based on their materials characteristics. For example, the efficiency of explosive chemical reactions depends on the energy yield, the kinetics of the chemical reaction, and the geometry and surface area of the component materials participating in the reactions. There are a variety of mechanisms responsible for the ignition and propagation of rapid chemical reactions. Traditional solid materials such as trinitrotoluene (TNT) are considered powerful energetics materials because the participating reaction atoms are positioned in a localized configuration to allow almost instantaneous reactions. While the heat of formation involved in the exothermic silicon oxidation is quite large (e.g., $\Delta H_f = \sim 911$ KJ/mole or 217 Kcal/mole), silicon in bulk configuration cannot serve as an efficient energetics material because the oxidation rate is diffusion limited by the relatively slow movement of oxygen through the silicon dioxide layer that is being formed on the surface of Si. However, one advantage of Si-based nanoparticles is that such diffusional limitations can potentially be overcome to enable an efficient use of the enormous energy yield associated with the exothermic reaction of silicon and oxygen, which can be higher than that of the common carbon-based explosive reactant materials.

While the demand for nanoscale silicon fuels are rapidly growing, the current high cost of the Si nanoparticles severely restricts its use to such silicon fuel applications. Yet, more complete silicon fuel chemical reactions with enhanced kinetics can be obtained if nano-scale fuels and oxidizers are utilized. This is primarily due to the effect of substantially increased surface area achieved at the nano-dimensions as compared to micro-dimensions. For example, metallic fuels such as aluminum-based nanostructures and mixtures exhibit impressive energetics results. Silicon has a similar heat of formation and energy density to aluminum on oxidation, and hence the nanoscale silicon materials may have similar functionalities as nanoscale aluminum materials. Yet, with respect to other characteristics, nanoscale silicon exhibits several advantages over nanoscale aluminum. For example the native oxide layer on Si is thinner than that of nanoscale aluminum, which allows for easier follow-up processing and provides less bathers to oxidation reactions. For example, the oxidation initiation temperature (or ignition temperature) is higher than in the case of nanoscale aluminum, which makes the nanoscale silicon less prone to accidental ignition. For example, nanoscale silicon is also resistant to the rapid aging effects observed in nanoscale aluminum, and thus can have a much better shelf-life for storage.

Silicon nanoparticles can be fabricated by several different techniques such as pulsed laser ablation (PLA) technique, evaporation, silane decomposition and chemical reaction synthesis. However, these conventional techniques are not amenable to large scale manufacturing and produce non-uniform particles mixed with fibers and dendrites. As a result, current Si nanoparticle prices can range at the level of several thousand dollars per kilogram, making them too expensive for wide-spread applications.

In one exemplary embodiment, the disclosed technology includes a device to produce spark eroded nanoparticles of Si and Si alloys with dimensions of less than a 80 nm average diameter with high yield and throughput.

Figure 13A:
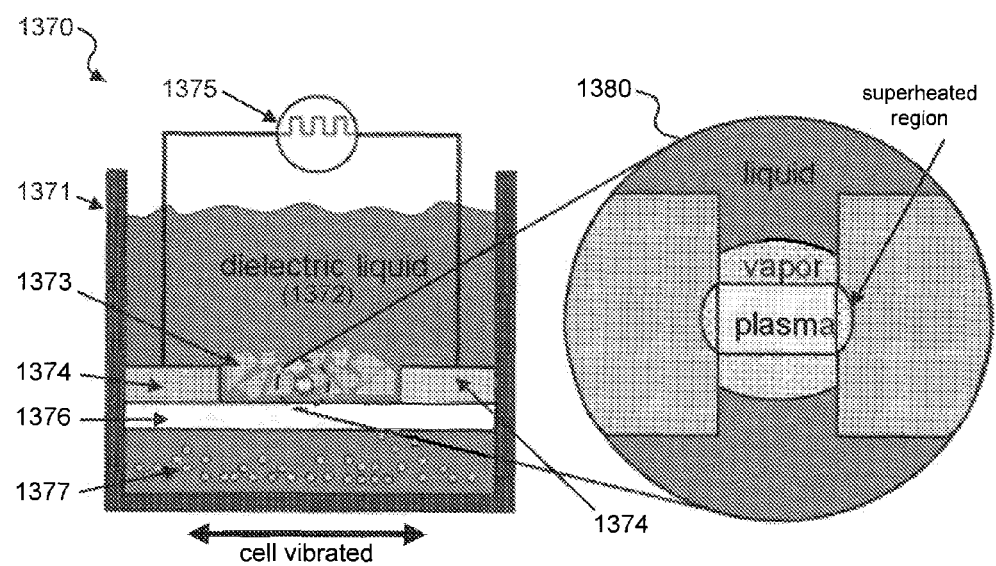
FIG. 13A shows a schematic of an exemplary spark erosion device for fabricating nanoparticles.

FIG. 13A shows a schematic of a spark erosion cell 1370 for fabricating spark eroded nanoparticles in large quantities, e.g., including spherical sub-80 nm silicon nanoparticles. The spark erosion cell 1370 can also be implemented to fabricate metallic nanoparticles and permanent magnet nanoparticles, e.g., of alloy, nitride, carbide, or other materials. As shown in FIG. 13A, a container 1371 contains a dielectric fluid 1372, e.g., such as liquid nitrogen or liquid argon. For example, the dielectric fluid 1372 can be a fluid that is free of oxygen, and the utilization of the dielectric fluid 1372 in the disclosed spark erosion processes can inhibit oxidation of the produced nanoparticles (e.g., producing silicon nanoparticles that are substantially free of oxygen). In some examples, the container 1371 can be configured as a double-walled, vacuum-jacketed glass container. The spark erosion cell 1370 can be configured in a shaker-pot configuration such that electrodes 1374 are positioned at a distance apart and immersed in the dielectric fluid 1372, in which the spark erosion cell 1370 is vibrated along one or more axes. The spark erosion cell 1370 can include a frame structure to provide positioning and/or structural support to various modules and/or components, e.g., such as the electrodes 1374. In some implementations, the frame structure can be loaded and unloaded in the container 1371, or, in other implementations, the container 1371 can be included as part of the spark erosion cell 1370 that functions as a frame structure to provide positioning and/or structural support to the various components and/or modules of the spark erosion cell 1370. The spark erosion cell 1370 includes a perforated screen 1376 coupled to the frame structure (e.g., the container 1371), in which at least a portion or the entire structure of the electrodes 1374 is configured above the perforated screen 1376, e.g., such as a perforated Delrin support. The electrodes 1374 are configured in connection to a pulsed power source 1375 located outside of the container 1371 and connected to the electrodes 1374 via insulated electrode leads 1378. Charge pieces 1373 can be can be deposited into the dielectric fluid 1372 on the top surface of the perforated screen 1376 of the spark erosion cell 1370. For example, the charge pieces 1373 can include bulk material pieces of silicon material, e.g., including doped silicon (with phosphorus or arsenic). In some examples, the charge pieces 1373 introduced in the dielectric fluid can be of a millimeter to centimeter size regime. For example, the electrodes 1374 and the charge pieces 1373 can be made to come closer frequently by intentionally-generated mechanical vibrations, e.g., with the two rotating target materials (e.g., charge pieces 1373) coming in near-contact frequently during their rotation in proximity Electric fields can be generated in the gaps existing between the electrodes 1374 and the charge pieces 1373 adjacent to the electrodes 1374, and between neighboring charge pieces 1373. For example, microplasmas (sparks) can be generated in these exemplary gaps, e.g., when the electric field in a gap is greater than the breakdown field of the dielectric. The exemplary generated microplasmas exhibit high temperatures that provide localized heat to the charge pieces 1373. For example, since the spark temperatures are very high (e.g., ~10,000 K), localized regions across the exemplary gaps are superheated by absorbing energy from the sparks (e.g., as shown in inset 1380). For example, when the spark collapses, tiny particles (e.g., molten droplets and/or vaporized material which can be of a nanometer size) can be ejected into the dielectric, e.g., in which the tiny structures are rapidly quenched/condensed to form solid spark eroded particles 1377. For example, in situ quenching of the exemplary droplets or condensed vapor can produce amorphous or nanocrystalline material, e.g., including spherical particles. For example, since oxygen can be substantially kept out of the spark erosion apparatus 1370, the spark eroded particles 1377 are produced in a manner that is considerably oxidation-free and include a substantially non-oxidized outer surface. These exemplary spark eroded particles 1377 particles can pass through the perforated mounting screen 1376 located at an end (e.g., the bottom) of the exemplary spark erosion cell 1370. The spark eroded particles 1377 can be subsequently collected and processed. For example, the container 1371 containing the spark eroded particles 1377 can be brought into an enclosed glove box or other enclosure having an inert atmosphere, and the dielectric fluid 1372 (e.g., liquid nitrogen or liquid argon) can be permitted to evaporate. The nanoparticles can then further processed, if desired for example, for separation of the spark eroded particles 1377 into different size groups, e.g., by sieving, gravitational separation or centrifugal separation. These processing steps can be conducted in an inert atmosphere to inhibit surface oxidation of the nanoparticles. Also, for example, microstructural analysis can be utilized to monitor the change of nanoscale structure of spark eroded Si nanoparticles, e.g., in terms of shape, size distributions, crystallinity, internal nano-grain structures, grain boundaries and other defects.

Figure 13B:
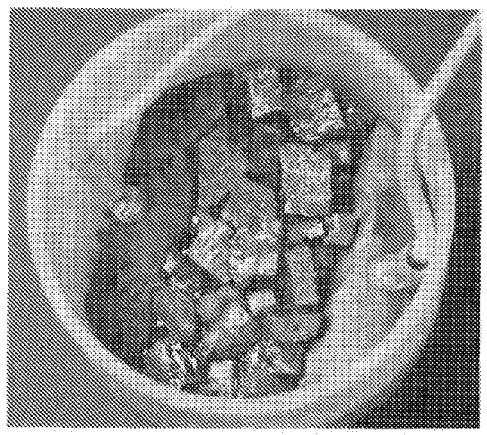
FIG. 13B shows an exemplary image of Si bulk charge pieces in a shaker pot container cell for use in the exemplary spark erosion process.

Exemplary implementations were performed to demonstrate the fabrication of silicon-based nanoparticles using the disclosed spark erosion technology. In some exemplary implementations, spark erosion of Si to obtain Si spark eroded nanoparticles was conducted by applying 400 V to charge a 100 μF capacitor. Doped silicon (with phosphorous or arsenic) was in the exemplary spark erosion implementation, and liquid nitrogen or liquid argon was used as the dielectric medium. For example, in some cases, the charge pieces sizes were bimodal, and the samples were sieved with a vibrating sieve assembly to minus 53 micrometer to remove some of the large particles and pieces chipped off the electrodes and charge during sparking. FIG. 13B shows an exemplary image of Si charge pieces in a shaker pot container cell (e.g., ~10 cm diameter) for use in the exemplary spark erosion process.

Figure 13C:
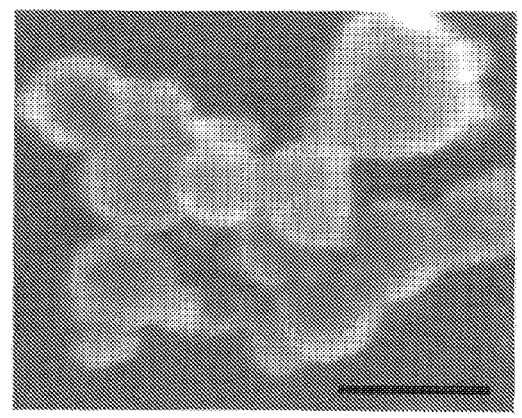
FIG. 13C shows an exemplary scanning electron microscopy (SEM) micrograph of the Si nanoparticles produced by the disclosed spark erosion technology.

FIG. 13C shows an exemplary scanning electron microscopy (SEM) micrograph of the Si nanoparticles produced by the disclosed spark erosion technology. The spark eroded nanoparticles may exhibit a spherical or near-spherical geometry, e.g., which can be due to the nature of the vapor or liquid condensation after sparking. The average nanoparticle size for this exemplary spark erosion implementation was ~40 nm, and the spark eroded nanoparticles exhibited little to no surface oxidation on the particle surface since the sparking and condensation of the nanoparticles were carried out in an oxygen-free dielectric liquid (e.g., liquid nitrogen). The scale bar shown in FIG. 13C represents 50 nm.

The disclosed spark erosion technique is a low-energy manufacturing process. For example, even though the peak pulse current may be considered high (e.g., ~1200 amperes, with spark actuation at a frequency of ~25 times per second), the average current used for spark erosion, considering the ratio of the residence time of sparking vs. sometimes longer idle time between pulses, is about 1 ampere, at a voltage of 400 Volts. Thus, the average power consumption is only about 400 W. Also, for example, the yield of the spark erosion-produced Si nanoparticles, e.g., from an exemplary bench-top apparatus with a 4 inch diameter and 4 inch tall sparking chamber (~1 liter volume) was ~4 g/hr (equivalent to 96 g/day).

The disclosed spark erosion technique is also a high throughput manufacturing process. For a larger spark erosion chamber of twice diameter and twice height (e.g., 20 cm diameter×20 cm height), the spark erosion rate can be about ~30 g/hr (equivalent to 0.72 kg/day in principle assuming a continuous or continual operation). Thus, for example, ten exemplary larger sparking apparatus operated in parallel can yield up to 7.2 kg/day of silicon nanoparticles.

The disclosed spark erosion technique can also produce similarly structured nanoparticles from an alloy target of Si—Ge. For example, for highly conductive metals and alloys, such as a $Bi_{0.5}Sb_{1.5}Te_3$ thermoelectric alloy with high ZT performance, a spark erosion synthesis rate of $Bi_{0.5}Sb_{1.5}Te_3$ thermoelectric alloy nanoparticles with a sub-50 nm average diameter has been achieved at a rate of 135 g/hr from the exemplary 10 cm chamber. For example, this throughput can produce an equivalent to ~25 kg/day for a continuous operation from a one 8-liter chamber. For example, the spark eroded nanoparticle yield can be enhanced by increasing the energy of the power pulses. Therefore, larger capacitors at higher voltages can be utilized to produce Si nanoparticles at higher rates. Furthermore, Si-metal binary alloy production scheme can be implemented to produce Si nanoparticles even more rapidly.

Implementations of the disclosed spark erosion technology can include the control of particular spark erosion parameters including voltage, current, capacitance, and spark erosion frequency. For example, in order to avoid commonly obtained micro-size particles and produce desired nanoparticles, higher voltage spark erosion can be more beneficial, e.g., which was shown in exemplary implementations of spark erosion synthesis of nanoscale thermoelectric Bi—Sb—Te alloy particles. For example, such spark erosion voltages can be selected in the range of 100-2,000 volts, and capacitance in the range of 50-1,000 μF for Si nanoparticle formation and for elements or metals or alloys having relatively low vapor pressure (e.g., including, but not limited to, Al, Ge, Ni, Ti, Co, Fe, Cr, V, Mn, Cu, and refractory metals such as Mo, Nb, W, Hf, Ta, W, Re, Os, etc.). For example, higher power pulses can produce increased vaporized material, e.g., as compared to molten droplets. The vaporized material generally condenses into nanoparticles, and the molten droplets generally freeze into microparticles. The frequency of sparking, e.g., ~25 cycles/sec, can be increased to as many as 1,000 cycles/sec for significantly enhanced particle synthesis speed, especially if the exemplary rotating electrode spark erosion system is utilized.

The dielectric media can include liquid nitrogen, liquid Ar, water, and dodecane, and exemplary implementations of the disclosed spark erosion techniques can include varying the dielectric media to investigate the effect of dielectric media materials on quench rate of vaporized Si vs. molten Si in the plasma with respect to the final particle shape, size uniformity and distribution, crystallinity, sub-grain-size within each particle, and the thickness of native $SiO_2$ formation. Scanning electron microscopy and transmission electron microscopy (TEM), as well as various other surface analytical tools, can be utilized for microstructure, geometry and compositional aspects.

The rate of spark erosion to synthesize nanoparticles can also be dependent on the melting point and vapor pressure of the metal or elemental species involved in spark erosion. For example, while a use of higher current and voltage during spark erosion partially compensates for the melting point and vapor pressure aspects, synthesis of Si nanoparticles at lower power levels can be achieved according to the disclosed technology. For example, as silicon exhibits a relatively high melting point and low vapor pressure, one way of enhancing the spark erosion is to utilize a "piggy-back" spark erosion technique, as described herein.

Figure 14B:
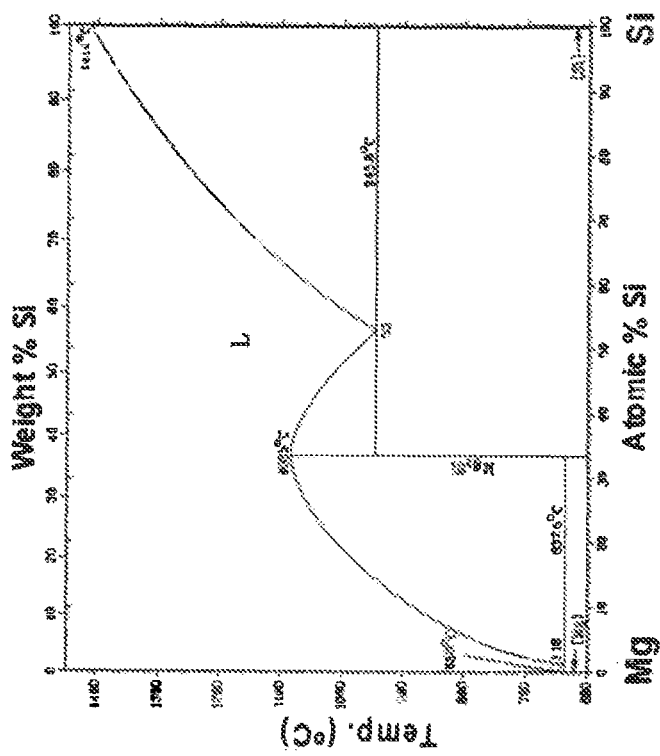
FIGS. 14A-14C shows the binary alloy phase diagram for Si—Zn, Si—Mg and Si—Al systems, respectively.
Figure 14A:
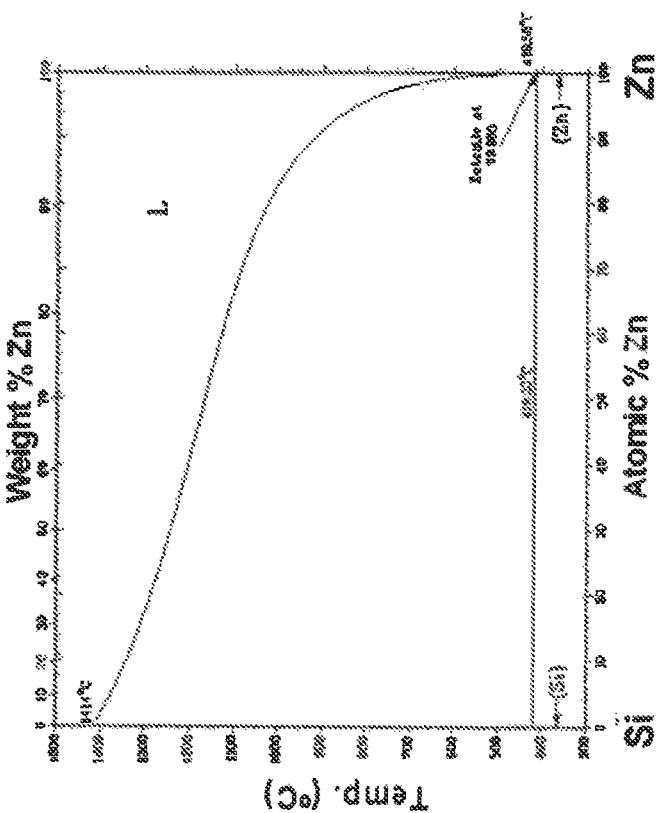
Figure 14C:
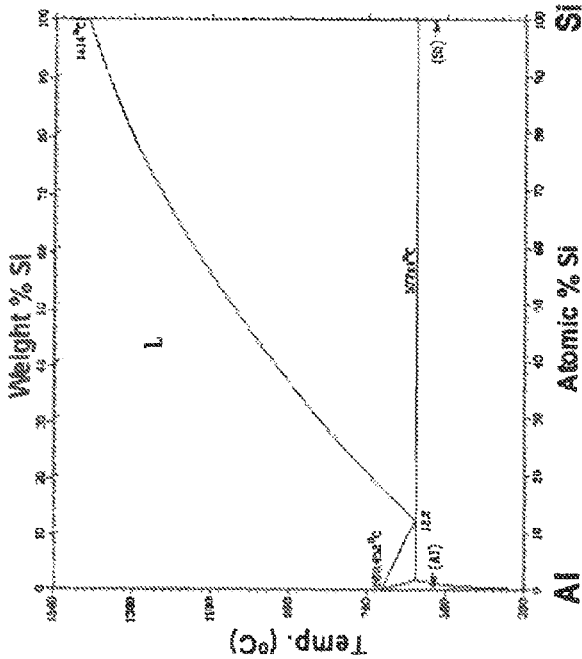

The "piggy-back" spark erosion concept includes inducing more active sparking of Si via sparking of lower melting point or lower vapor pressure metal in Si-metal binary alloy targets, yet with immiscible metals, e.g., including, but not limited to Si—Zn, Si—Mg, or Si—Al alloys. Such sparking can produce an enormous temperature rise to ~10,000 K in the micro-plasma. Silicon grains near the Zn grains can "piggy-back spark" under such environment. For example, Si-metal alloy spark erosion can be implemented as an indirect means of significantly increasing the Si particle synthesis rate, for example, using spark erosion of a ~50% Si-50% Zn (in atomic %) alloy target. For the exemplary "piggy-back" spark erosion process to be useful, the Si element and the other lower melting point element should have a small mutual solubility. For example, the desired solubility limit of the two elements for "piggy-back" spark erosion processing can be at most 5 atomic %, but in some examples, at most 2 atomic % (or in some examples, at most 0.5 atomic %), e.g., at 400° C. FIG. 14A shows the binary alloy phase diagram for the Si—Zn system, which indicates that Si and Zn are essentially immiscible. For example, the Si—Zn alloy target for spark erosion provides a much higher electrical conductivity and ductility for easier sparking. For example, the size of the sparks in the spark erosion process can be in the 50-100 micrometer regime, and the grain size in the exemplary Si—Zn composite alloy target can be made on this order. For example, such a microscale target material is obtained by either chill cast or sinter-consolidation, e.g., with the grain size less than 500 μm, and in some examples less than 100 μm. For example, the sparking vaporization Zn can enable spark vaporization of Si from the microstructured spark erosion target and charge materials. Other alloy targets can be implemented using the exemplary "piggy-back" spark erosion techniques, including Si—Mg and Si—Al targets. FIGS. 14B-14C shows the binary alloy phase diagram for the Si—Mg system and Si—Al system, respectively. For example, after the spark erosion, the non-Si element such as Zn, Mg, or Al can be chemically selectively etched away, e.g., so as to obtain predominantly Si nanoparticles. For example, other binary or ternary alloy systems of Si, Ge or Si—Ge can utilize a similar approach for enhanced nanoparticle synthesis rate.

A high-speed spark erosion rate can thus be obtained for higher melting point metals, alloys and semiconductors including, but not limited to, Si, Ge, Ni, Ti, Co, Fe, Cr, V, Mn, Cu, Al, and refractory metals such as Mo, Nb, W, Hf, Ta, W, Re, Os, etc., by mixing with high vapor pressure metals, e.g., including, but not limited to, Zn, Mg, Ca, Sb, Bi, In, Ga, Ag, and alloys of among these elements or with other elements. The improvement in synthesis rate implementing this exemplary mixed target approach can be at least 30% faster rate, and in some examples, be at least 100% improved synthesis rate, as compared to the non-mixed phase metallic or semiconductor target.

Figure 15:
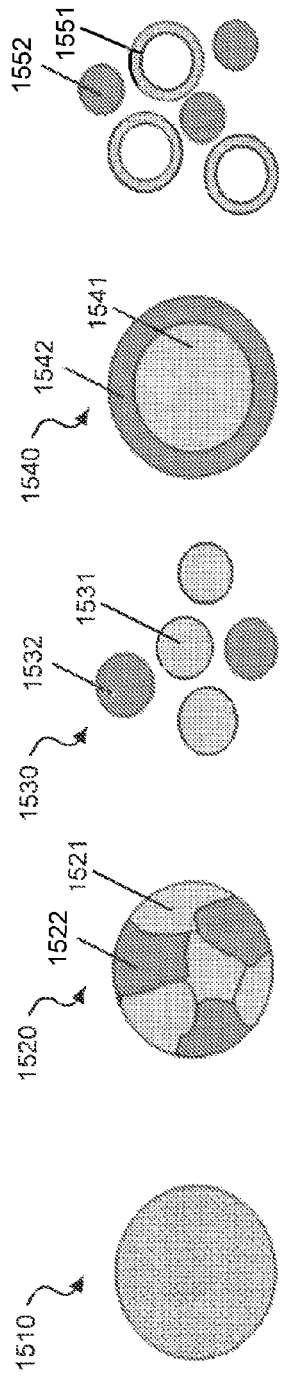
FIG. 15 shows a schematic illustration of exemplary configurations of Si-based alloy spark eroded nanoparticles.

Such sparking of Si-metal alloys and subsequent rapid quench consolidation (e.g., at a quench rate as high as $10^6$ K/sec) in a dielectric medium of liquid nitrogen, liquid argon, cold water, or organic liquid, can produce nanoparticles with a variety of structures. FIG. 15 shows a schematic illustration of exemplary structural configurations of Si-based alloy spark eroded nanoparticles. For example, the exemplary structural configurations can be formed for either 50%-50% atomic % mix ratio or non-equal atomic % mix ratio, in which the scenario can depend on other spark erosion parameters and factors, e.g., including voltage, current, sparking frequency, metallic species involved, volume percent of each phase in the alloy, and dielectric liquid used (e.g., as the kinetics of melting, vaporization, micro-plasma formation, and quench rate is influenced).

As shown in FIG. 15, the spark eroded nanoparticles can include an amorphous, metastable structure illustrated by the particle 1510. The spark eroded nanoparticles can include mixed phase crystalline grains structure illustrated by the particle 1520, e.g., including Si silicon grains 1522 and Zn grains 1521 in this example. The spark eroded nanoparticles can include separate formations of homogeneous nanoparticles 1530, e.g., such as Si nanoparticles 1532 and Zn nanoparticles 1531 in this example. The spark eroded nanoparticles can include a core-shell structure illustrated by the particle 1540, e.g., which can be configured with a Mg or Al core 1541 encased by a Si shell 1542 as shown in this example. The spark eroded nanoparticles can also include a hollow shell nanoparticles 1551 with solid nanoparticles 1552 of the other material.

For example, if the amorphous structure of the exemplary Si-based alloy nanoparticle 1510 can be passivated, e.g., by selective oxidation or coating of a very thin $SiO_2$ surface of a sufficient thickness, such a structure can take advantage of the known stability/characteristics of Si passivation surface together with the much higher heat of formation of Al or Mg. For example, the amorphous alloy structure of the exemplary Si-based alloy nanoparticle 1510 can be intentionally crystallized into a multi-grain structure exhibited by the exemplary Si—Zn nanoparticle 1520, e.g., by implementing controlled low-temperature annealing (e.g., at less than 300° C.). For example, the mixed phase grain structure of the exemplary Si—Zn nanoparticle 1520, if surface protected as discussed below, can also be utilized as an efficient energetic material. The nanograined structure within the exemplary Si—Zn nanoparticle 1520 can provide an enormous internal grain boundary surface area, which could be utilized for accelerated oxidation kinetics for specific applications. For example, the separated nanoparticle mixture of exemplary nanoparticles 1530, the exemplary Zn nanoparticles 1531 (or Al or Mg nanoparticles) can be removed if desired, e.g., by chemical dissolution or density-based separation processes (although, e.g., they can contribute to oxidative heat of formation). For example, the core-shell structure of the exemplary nanoparticle 1540 can provide both the stability of exemplary Si shell material 1542 and the higher reaction energy of the exemplary Mg or Al core material 1541 on rapid oxidation. For example, as the vapor condensation kinetics and solidification temperature from vapor or liquid can be different for Si vs. Mg vs. Al, the exemplary core-shell structure nanoparticle 1540 can be formed under certain spark erosion circumstances. For example, one exemplary circumstance of inducing Mg or Al core structure with Si shell can include implementing spark erosion in the presence of dispersed silica nanoparticles (e.g., such as using inexpensive silica colloidal solution having 4 nm size silica nanoparticles). In this example, the silica seed could serve as nucleation sites for easier Si precipitation first, followed by Mg or Al precipitation on Si nanoparticle surface to form a core-shell structure. In another example as an alternative processing scheme, a step-wise spark erosion of Mg (or Al) nanoparticle formation can be utilized first, followed by Si spark erosion, so that the existing Al or Mg nanoparticles can serve as the seed for nucleation of Si shell. For example, the exemplary hollow shell nanoparticles 1551 can be configured as Al nanoparticles obtained during spark erosion processes of Al metal, e.g., as these hollow spheres tend to float in a liquid media. The exemplary hollow spheres can contain unpassivated (unoxidized), virgin aluminum internal wall surfaces, which can provide a burst of oxidation energy as the spheres are fractured during reactive processes involving mechanical or thermal events.

Exemplary benefits, features, and advantages of utilizing the binary alloys such as the exemplary Si—Zn, Sn—Al, Sn—Mg systems for Si nanoparticle spark erosion formation include: (i) much higher electrical conductivity of Zn (or Mg or Al) that allows for easier sparking at lower current and voltage, so the silicon spark erosion synthesis rate for the given power supply can increase significantly; (ii) higher ductility of these metals as compared to Si can provide increased mechanical integrity during the spark erosion process with reduced chipping or breaking off of macro or micro particles; (iii) alloying of Si nanoparticle surface or core-shell structure may provide additional opportunities for optimization of long-term stability of Si nanoparticles or the kinetics of rapid oxidation; (iv) a mixture of non-silicon metallic material such as Zn, Mg, Al, e.g., either as a metastable solid solution, as a nano-grains mixed, or as a core within Si shell nanoparticles, can contribute to additional energy generation during rapid oxidation [for example, the heat of formation of MgO ($\Delta H_f \sim -293$ Kcal/mole) and that of $Al_2O_3$ ($\Delta H_f \sim -267$ Kcal/mole) are much larger than that of $SiO_2$ ($\Delta H_f \sim -217$ Kcal/mole), and the formation of ZnO ($\Delta H_f \sim -170$ Kcal/mole), e.g., if Zn is kept as fresh metal in the core of the core-shell structure nanoparticle 1540, can also contribute to the eventual energetic reactions]; and (v) the exemplary metals Zn, Mg, Al are all environmentally safe and abundant on the earth. If the use of the described Si-based nanoparticles in energetics applications can be partially replaced with these exemplary abundant elements, then the undesirable dependency or cost fluctuations that might arise from possible expansion of Si use in other industrial sectors, e.g., including, but not limited to semiconductors and photovoltaic solar cells, can also be mitigated.

In another aspect, the disclosed technology can include pseudo core-shell type magnet-magnet composite structure formation.

The exemplary two composition magnetic nanocomposite can include a hard magnet first phase of larger particles coated with second phase magnet composition having smaller particles or grain structure. The two different composition magnetic materials can be configured to have quite different nanoparticle sizes, and either one or both phases can be synthesized by spark erosion, chemical precipitation, mechanical grinding, atomization, or spray pyrolysis. The nanoparticle sizes of the first composition or second composition magnet material can be altered as needed by utilizing the disclosed spark erosion synthesis technique, for example, by employing higher current density pulses to produce finer nanoparticle diameter. In some implementations, the two compositions that will be mixed after the separate particle synthesis can be selected in such a way that the smaller particle magnet material has a lower melting point (e.g., below 500° C., and in some examples, below 300° C., for example, including MnBi magnet alloy having a eutectic decomposition partial melting temperature of 262° C.) and mechanically more ductile than the first composition magnet material. The first composition magnet material configured as larger size nanoparticles can have a melting temperature higher than 1000° C.

Figure 16:
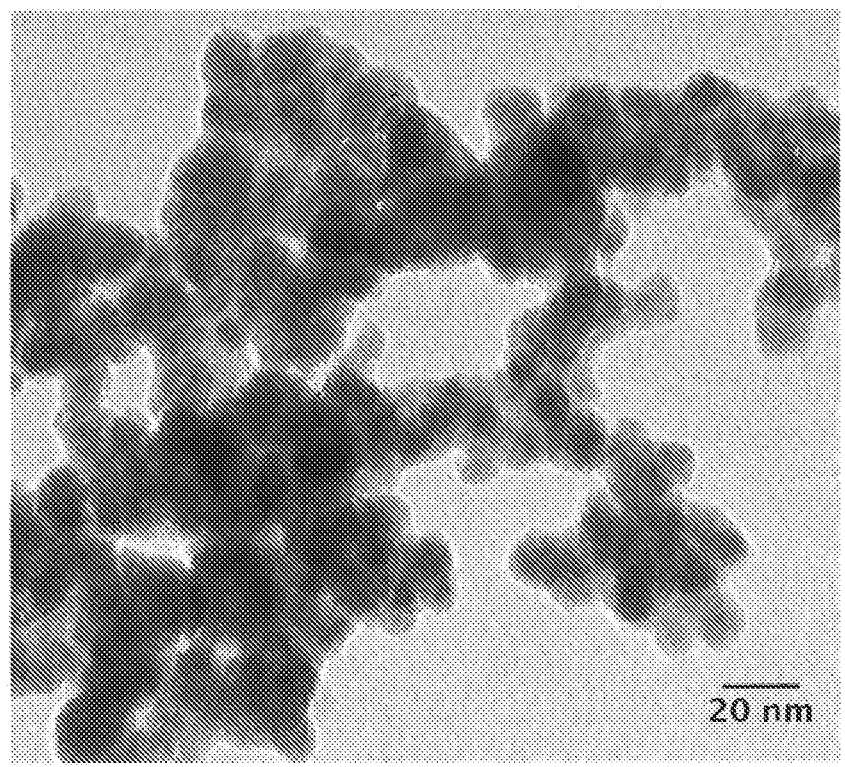
FIG. 16 shows a TEM micrograph of exemplary spark eroded MnBi nanoparticles, e.g., with a 15-20 nm diameter.

For example, such a choice of two magnet materials allows an easier fabrication of the nanocomposite materials having either the pseudo core-shell structure or the grain boundary second magnetic composition coating layer structure that envelops the first magnetic composition larger particles. For example, in permanent magnet structures, a coating of the first composition hard magnet larger nanoparticle surface with another hard magnet material with higher magnetic saturation having a much lower melting temperature or softening temperature can lead to easier manufacturing of consolidated magnet, and at the same time enables enhanced magnetic properties due to the exchange coupling that forces the lower magnetic moment hard material core to exhibit higher magnetic moment and hence increased energy product magnet strength. The first hard magnet composition can be selected from a variety of hard magnet materials, e.g., including, but not limited to, rare-earth cobalt or rare-earth iron based magnets such as Nd—Fe—B or, Sm—Co, metal carbide magnets such as Co—C, refractory metal-cobalt magnets such as Zr—Co or Hf—Co, $L1_o$ type magnets such as CoPt, CoPd, FePt, Fe-nitride or Fe—Ni type magnets, or AlNiCo type or Fe—Cr—Co type spinodally decomposing magnets. An exemplary second composition magnet material to provide much smaller nanoparticle size includes MnBi (e.g., with the Bi content within the plus/minus 20% from the stoichiometry MnBi composition). An example MnBi nanoparticles fabricated by the disclosed spark erosion techniques is presented in FIG. 16. FIG. 16 shows a TEM micrograph of exemplary spark eroded MnBi nanoparticles, e.g., with a 15-20 nm diameter.

For example, the use of the lower melting point second magnet composition is thus important as their presence allows a convenient lower temperature sintering consolidation with an advantage of lower-cost, higher-throughput manufacturing, e.g., especially if combined with mechanical compaction or mechanical deformation that allows partial metallic cold welding involving the lower melting temperature phase. For example, a NdFeB type or Sm—Co type permanent magnet nanoparticles with a larger diameter of, e.g., 200 nm (or, for example, a 50-500 nm diameter range) can be enveloped with MnBi nanoparticles of, e.g., 40 nm diameter (or, for example, 20-60 nm diameter range) by mixing of the two types of composition nanoparticles, then heating to, e.g., above ~300° C. to partially eutectic melt the MnBi magnet material having a eutectic decomposition temperature of 262° C. and to enable a semi-liquid-phase sintering consolidation of the Nd—Fe—B type or Sm—Co type permanent magnet nanoparticles.

Figure 17:
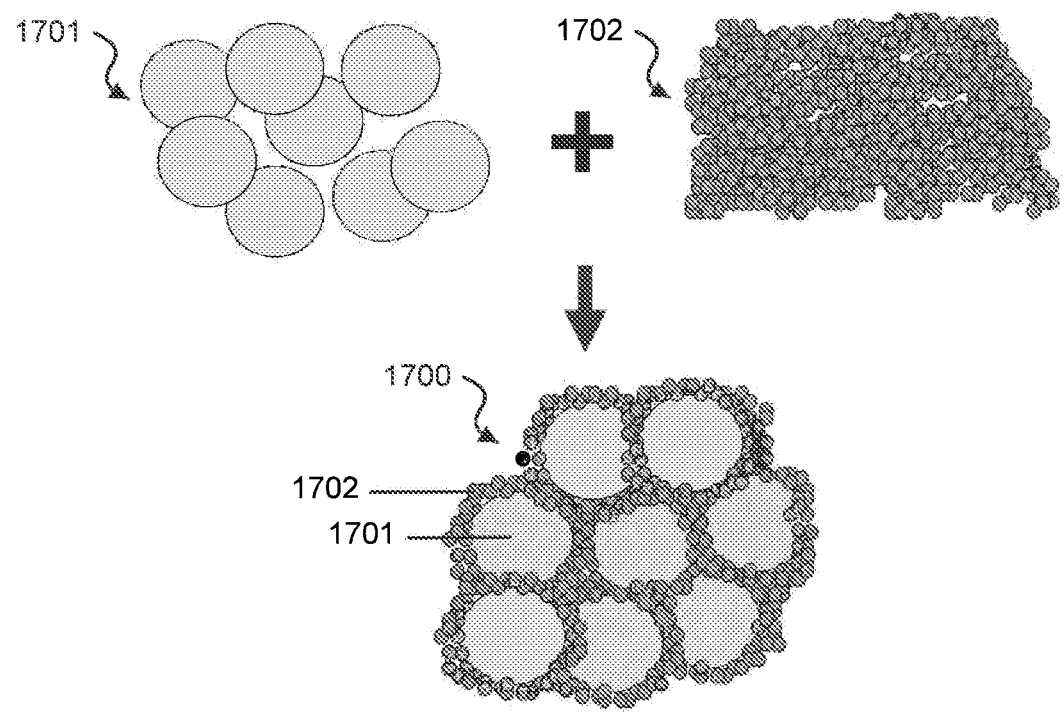
FIG. 17 shows a schematic illustration of an exemplary (hard-hard) exchange magnet nanocomposite formed of two different magnet compositions and nanoparticle sizes.

Other exemplary permanent magnet alloy or magnet compound materials beside the rare-earth transition metal type $Nd_2Fe_{14}B_1$, $Sm_1Co_5$, $Sm_2Co_{17}$ or $Y_1Co_5$ type permanent magnet nanoparticles that can be employed as the first composition hard magnet material and processed into a similar pseudo-core-shell structure also have melting temperature of at least 1000° C., can include, but are not limited to, transition metal carbide magnets (e.g., $Co_2C$ or $Co_3C$ magnets), nitride magnets such as Fe—N or Co—N or (Fe,Co)—N, L1o phase magnets (e.g., CoPt, FePt), or AlNiCo type, Fe—Cr—Co type spinodally decomposing alloys, or refractory metal-cobalt intermetallics (e.g., such as $HfCo_7$, $Hf_6Co_{23}$, or Zr—Co intermetallics). Exemplary composite nanostructured magnet materials comprising these magnet materials and lower melting point magnet material (e.g., such as MnBi) can be consolidated by heating to a relatively low temperatures below 600° C., or in some examples, below 400° C. FIG. 17 shows a schematic illustration of an exemplary (hard-hard) exchange magnet nanocomposite 1700 with two different magnet compositions and two different nanoparticle sizes. The nanocomposite 1700 can be formed from a 'composition 1' particles 1701 of hard magnet nano-/micro-particles (e.g., with 50-300 nm diameter and high $H_c$~3-20 KOe) and a 'composition 2' particles 1702 of lower melting point (mp) or eutectic-like hard magnet nanoparticles with a smaller size than the particles 1701 (e.g., in which the particles 1702 can include 10-50 nm diameter and a high $H_c$~5-30 KOe). The schematic of FIG. 17 shows a process to mix the particles 1701 and 1702 for exchange coupling enhancement and consolidation of the two different nanoparticles into a bulk magnet at a low temperature (e.g., with optional mechanical deformation and metallic bonding). For example, the consolidation technique can facilitate the lower melting point MnBi magnet nanoparticles 1702 forming an envelope to surround the high melting point, larger nanoparticles 1701 to form a pseudo core-shell structure of the nanocomposite 1700, e.g., with the MnBi serving as the "magnetic glue".

For example, the exemplary low temperature sintering processing for alloy particle consolidation is important because the avoidance of the high temperature sintering of the first composition magnet nanoparticles (e.g., 700-1000° C.) can result in an undesirable grain growth to make the first composition magnet grain size larger than the domain wall boundary to cause them to become multi-domain structure with reduced coercivity and magnet strength, rather than the desired single domain island structure. For example, the second composition smaller nanoparticle magnet material serves as a "magnetic glue" to put together the first composition magnet nanoparticles, but with a substantial contribution to magnet properties by itself. The exemplary MnBi "magnetic glue" structures are especially beneficial because the MnBi magnet phase exhibits a positive temperature coefficient of magnetic crystal anisotropy, which results in an improvement of magnetic coercivity ($H_c$) as the operating temperature of magnets is increased, e.g., which is a beneficial feature opposite to most of the permanent magnet materials behavior. This exemplary advantage of the MnBi "magnet glue" can be utilized to produce permanent magnets with desirably reduced temperature-dependent loss of coercivity and magnet energy product as the motor temperature can often reach 100-200° C. during operation in an automobile including electric vehicles.

For example, if mechanical compression is applied during sintering, e.g., such as in spark plasma sintering, warm/hot pressing, or if significant mechanical compaction is applied prior to the sintering, e.g., as in the case of swaging, rolling, extrusion, the bonding of the lower melting point phase of MnBi will be facilitated because of metal-metal cold-welding effect or at least closer contact effect, and hence the sintering temperature or time can be further reduced.

In an another aspect, the disclosed technology can include permanent magnet composition nanoparticles bonded by lower melting temperature "metallic glue".

For example, the second composition nanoparticles can be selected from nonmagnetic, lower melting point (e.g., including, but not limited to, Sn, Zn, Sb, Bi, In, Ga, Al, Mg, or their alloys with the melting point below 700° C., and in some examples below 500° C., or even below 300° C.). The second composition smaller diameter nanoparticles that envelope the first composition nanoparticles can be molten or rapidly diffused during low temperature sintering of e.g., 250-600° C., for example 250-400° C. to make the first composition alloy particles to get consolidated. Alternatively, the mixture of the first composition large diameter nanoparticles and the second composition smaller diameter nanoparticles can be mechanically compacted or impact compacted or compressive deformation compacted (e.g., by swaging, extrusion or cold/warm rolling) for cold-welding type consolidation, which by itself might be adequate for use or might make the requirement for the follow-up low temperature sintering process much less demanding. Any use of the metallic jacket material that protects the nanoparticle composites during the plastic deformation compaction also helps to keep the nanocomposite mechanically more robust.

For example, while low temperature consolidation of the magnet phase nanoparticles can also be accomplished by epoxy bonding, the use of "metallic glue", for example, for consolidation of spark eroded nanoparticle magnets with low melting temperature metals has the following exemplary advantages. The "metallic glue" accomplished by molten metal or softened metal can metallurgically react with the magnet phase nanoparticle surface for stronger metallic bonding by formation of thin alloyed interface, which can produce a mechanically much more robust magnet pieces, more resistant to mechanical stresses, thermal stresses, temperature-resistance, humidity environment, or corrosive environment than the epoxy or polymer bonded magnets. Such a structure of subdivided magnetic phase particles by low melting point metal or alloys serves to reduce the grain size of the magnet phase due to the much lower sintering temperature that can be utilized, which results in avoiding or reducing the amount of the magnet material having the undesirable multi-domain structures.

In another aspect, the disclosed technology can include fabrication techniques of the boundary decoration of a first composition particle by using a liquid precursor such as a water or organic soluble precursor. For example, a second composition material can be added to the first composition nanoparticles as a soakable or penetratable liquid of aqueous solution or molten salt containing nitrate, chloride, sulfate, acetate, fluoride, etc., or their mixture that contains the desired metallic components such as Sn, Zn, Sb, Bi, In, Ga, Al, Mg, Cu, Ag. For example, a precursor solution can contain the elements in the exemplary second composition, e.g., including magnetic elements including $MnCl_2$ and $BiCl_3$ aqueous solution or molten salt.

Figure 18:
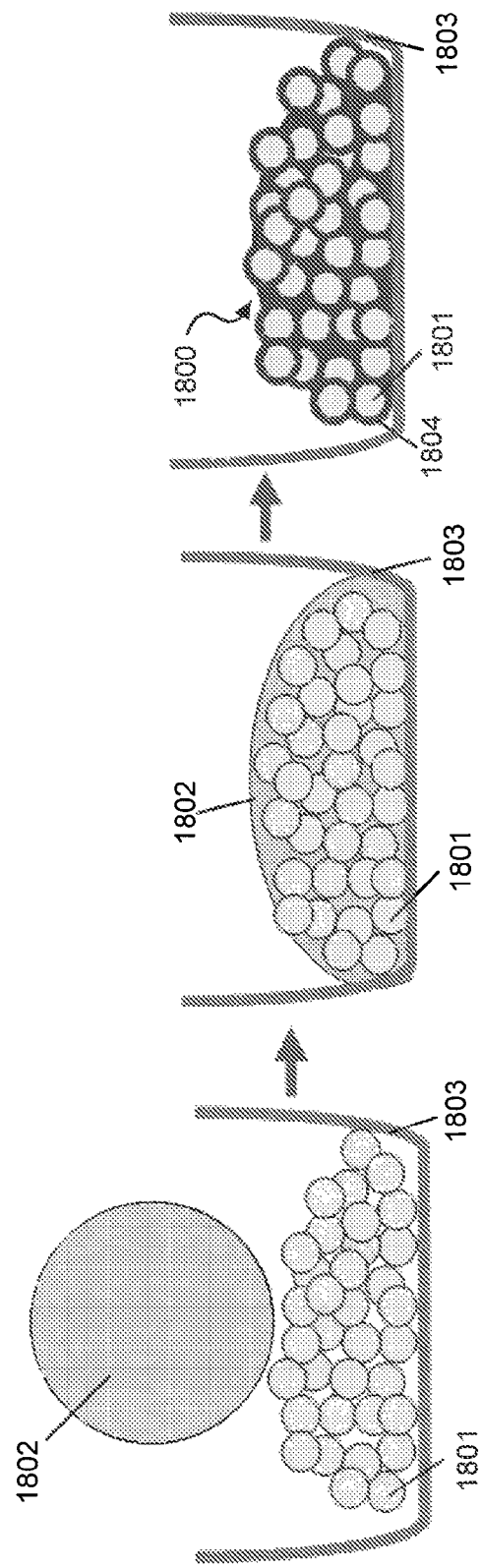
FIG. 18 shows a schematic illustration of a process to synthesize a nanocomposite hard-hard mixed magnet material.

FIG. 18 shows a schematic illustration of a process to synthesize a nanocomposite hard-hard mixed magnet structures 1800 using 'composition 1' larger diameter composition hard magnet nanoparticles 1801 soaked and reduction heat treat-bonded with a 'composition 2' hard magnet material 1802 contained in a container 1803 to form a coating 1804 on the composition 1 nanoparticles 1801, thereby producing the nanocomposite hard-hard mixed magnet structures 1800. The composition 2 magnet alloy material 1802 has desirably lower melting temperature or partial eutectic temperature for easier bonding, e.g., such as the case of MnBi. For example, the composition 2 magnet material 1802 can be added as a soakable liquid or molten salt by utilizing a precursor of nitrate, chloride, iodide, sulfate, or acetate, or fluoride that contains Mn and Bi metal contents or any other desired composition 2 metal elements in the precursor salt. The exemplary container 1803 can be configured as a ceramic container. For example, after soaking the first composition nanoparticles 1801 with the liquid precursor comprising the second composition material 1802, the well-mixed material is dried, e.g., optionally ground for further mixing, and then heated to an intermediate temperature of 100-500° C., or in some implementations, 100-300° C., in inert or reducing atmosphere to decompose the precursor second composition material 1802 into a metallic (or alloy) composition (e.g., a pseudo core-shell structure).

In another aspect, the disclosed technology can utilize a dimension-reducing uniaxial or unidirectional deformation on spark eroded nanoparticles within a metal jacket.

Deformation techniques such as by swaging, rod drawing, cold or warm rolling can be implemented on the disclosed spark eroded nanoparticles, either at room temperature or at elevated temperatures, so as to obtain anisotropically elongated alloy microstructure with reduced grain size, provide much higher compaction and density than the simple aggregates or presses green compacts of spherical particles. An increased defect density is also obtained by such plastic deformation, which makes the metal/alloy material stronger and more ductile, e.g., enhancing phonon scattering and reducing thermal conductivity by at least 20%, e.g., particularly by at least 40%, and improving mechanical strengths by at least 20%, e.g., particularly by at least 40%. The magnetic strength (e.g., coercive force or energy product) can also be improved, e.g., by at least 20% due to enhanced compaction and elongation/alignment of the exemplary nanoparticles.

Figure 19:
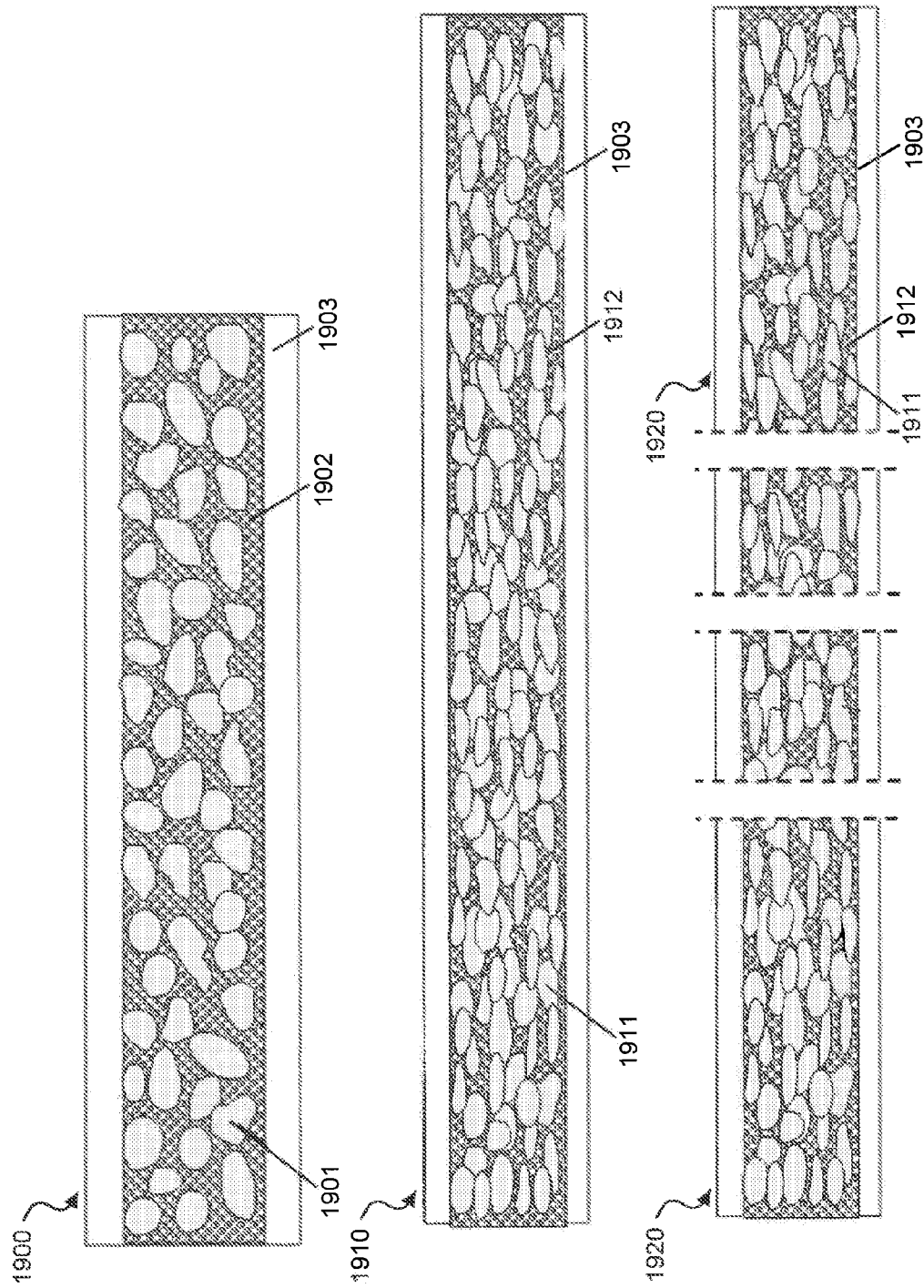

FIG. 19 shows a schematic illustration of such (hard-hard) magnet nanocomposite material 1900 subjected to an uniaxial deformation, e.g., such as swaging, extrusion, rod rolling or cold rolling. The hard magnet composition 1 nanoparticles 1901 and composition 2 hard magnet material 1902 with lower melting point and smaller diameter are uniformly mixed, e.g., in inert, reducing or vacuum atmosphere to minimize oxygen or air, and placed within a metal tube jacket structure 1905, e.g., such as Cu, Fe, stainless steel. The nanoparticles 1901 can include, but are not limited to, Nd—Fe—B, Sm—Co, Co—C, Fe—N, Zr—Co, Hf—Co, or other hard magnet materials. The hard magnet material 1902 can include, but is not limited to, MnBi. The mixed nanoparticles are then uniaxially deformed and compacted (e.g., by swaging, extrusion, cold/warm rolling, or rod rolling) in the metal jacket structure 1905, forming deformed composition 1 nanoparticles 1911 and deformed composition 2 nanomaterial 1912, with the desired deformation amount, e.g., in the range of 10-50% reduction in cross-sectional area of the deformed jacket, and in some examples, at least 75% reduction in area. For example, an optional low temperature sintering can be given at e.g., 300° C. for 1-10,000 hr, or in other examples 1-100 hr, in an inert or vacuum or reducing atmosphere. Deformed (and optionally sintered) rods 1910 can be sliced/cut to desired lengths and used as individual magnets, shown as the mechanically deformed and sliced nanocomposite materials 1920. Alternatively, for example, the swaged or extruded round rods can be plastically deformed/compressed into rectangular or square cross-section rods by rod-rolling, and then cut to length. The metal jacket structure 1905 can serve as a convenient mechanical strengthening or corrosion-reducing jacket, but the jacket structure 1905 (e.g., such as Cu) can be dissolved if desired by light acid etching.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of producing nanoparticles by spark erosion, comprising:

dispersing bulk pieces of an electrically conducting material in a dielectric fluid within a container by providing mechanical vibrations within the dielectric fluid, wherein the dispersing includes continuously or semi-continuously depositing the bulk pieces into the dielectric fluid within the container, wherein the bulk pieces include an alloy material and the dielectric fluid within the container excludes oxygen, wherein the alloy material includes a first material with a first vapor pressure property and a second material with a second vapor pressure property higher than the first vapor pressure property, and wherein the first material includes at least one of Si, Ge, Ni, Ti, Co, Fe, Cr, V, Mn, Cu, Al, Mo, Nb, W, Hf, Ta, W, Re, or Os, and wherein the second material includes at least one of Zn, Mg, Ca, Sb, Bi, In, Ga, or Ag;

using electrodes in contact with the dielectric fluid that are separate from one another to apply electric pulses to the bulk pieces near the electrodes to generate an electric field which creates a plasma in a volume existing between the bulk pieces that locally heats the bulk pieces to form structures within the volume, wherein the dielectric fluid quenches the formed structures to form nanoparticles, and wherein generating the electric field in the dielectric fluid creates the plasma in the volume existing between the bulk pieces that locally heats the second material to vaporize such that the vaporization of the second material induces the first material to vaporize and form structures within the volume, wherein the dielectric fluid quenches the formed structures to form the nanoparticles; and filtering the nanoparticles in the dielectric fluid through a screen including holes of a size allowing nanoparticles of the size or smaller to pass through the screen to a region in the container, wherein the dielectric fluid is selected to inhibit oxidation of a surface of the nanoparticles.

2. The method of claim 1, wherein the dielectric fluid includes at least one of liquid nitrogen or liquid argon.

3. The method of claim 1, wherein the size is in a range of 10 nm to 300 nm.

4. The method of claim 1, further comprising annealing the filtered nanoparticles.

5. The method of claim 4, wherein the annealing is implemented at a temperature in a range of 200 to 300° C. over a time duration in a range of 2 to 24 hours.

6. The method of claim 1, further comprising:

coating the surface of the nanoparticles with smaller nanoparticles; and sintering the coated nanoparticles to form a nanocomposite material including nanoscale grains of the material of the nanoparticles and the smaller nanoparticles along the boundaries of the grains, wherein the smaller nanoparticles inhibit growth of the grains in the nanocomposite material.

7. A method of producing nanoparticles by spark erosion, comprising:

dispersing bulk pieces of an electrically conducting material in a dielectric fluid within a container by providing mechanical vibrations within the dielectric fluid, wherein the dispersing includes continuously or semi-continuously depositing the bulk pieces into the dielectric fluid within the container;

using electrodes in contact with the dielectric fluid that are separate from one another to apply electric pulses to the bulk pieces near the electrodes to generate an electric field which creates a plasma in a volume existing between the bulk pieces that locally heats the bulk pieces to form structures within the volume, wherein the dielectric fluid quenches the formed structures to form nanoparticles;

filtering the nanoparticles in the dielectric fluid through a screen including holes of a size allowing nanoparticles of the size or smaller to pass through the screen to a region in the container, wherein the dielectric fluid is selected to inhibit oxidation of a surface of the nanoparticles;

forming an oxidized coating on the surface of the nanoparticles to produce core-shell surface oxidized nanoparticles;

compacting the core-shell surface oxidized nanoparticles; and sintering the compacted core-shell surface oxidized nanoparticles to form a nanocomposite material including nanoscale grains of the material of the nanoparticles and nanoscale oxide regions.

8. The method of claim 7, wherein the forming includes at least one of using an oxygen-containing dielectric liquid as the dielectric fluid, dispersing the bulk pieces in the dielectric fluid with liquid oxygen, doping the material of the bulk pieces or the electrodes with an oxidizable element, or exposing the nanoparticles to an oxygen-containing atmosphere including at least one of air or oxygen-containing Ar gas.

9. The method of claim 1, wherein at least one of the electrodes or the bulk pieces comprise a composite material including a metal or alloy and at least one other phase material, and wherein the formed nanoparticles include a multi-phase nanostructure.

10. The method of claim 1, wherein the container includes a first aperture at a top of the container and a second aperture at a bottom of the container, and further comprises:

an upper container to store the bulk pieces and deposit the bulk pieces into the container, the upper container having a hollowed interior with an opening at the bottom and a valve to expose or seal the opening, wherein the opening of the upper container is connected to the first aperture of the container via the valve to control deposition of the bulk pieces into the container; and a lower container to receive the nanoparticles, the lower container having a hollowed interior with an opening at the top and a valve to expose or seal the opening, wherein the opening of the lower container is connected to the second aperture of the container via the valve to control collection of the nanoparticles from the container.

11. The method of claim 1, wherein the formed nanoparticles are nanocomposite particles of the first and second materials, and wherein the nanocomposite particles include at least one of an amorphous metastable solid solution structure, a mixed phase crystalline structure, or a core-shell structure, or wherein the nanoparticles include separate nanoparticles of the first material and nanoparticles of the second material, or wherein the separate nanoparticles include a hollow sphere structure of one of the first material or second material.

12. The method of claim 1, further comprising:

storing the bulk pieces in an upper container above the container;

operating a valve between the upper container and a lower container to control continuous or semi-continuous deposition of the bulk pieces into the container.

13. The method of claim 1, wherein the mechanical vibrations cause an increased number of local discharge contact points for spark erosion between the bulk pieces in the reaction chamber.

14. The method of claim 1, further comprising rotating two adjacent electrodes of the electrodes in opposite rotations to facilitate formation of the nanoparticles from the bulk pieces.

15. The method of claim 1, wherein the applied electric pulses include a voltage of at least 100 V and at a frequency of at least 60 Hz, and wherein the generated electric field is capable to produce a capacitance discharge between the bulk pieces of at least 20 µF in the formation of the structures.

16. A method of producing nanoparticles by spark erosion, comprising:

dispersing bulk pieces of an electrically conducting material in a dielectric fluid within a container by providing mechanical vibrations within the dielectric fluid, wherein the dispersing includes continuously or semi-continuously depositing the bulk pieces into the dielectric fluid within the container;

using electrodes in contact with the dielectric fluid that are separate from one another to apply electric pulses to the bulk pieces near the electrodes to generate an electric field which creates a plasma in a volume existing between the bulk pieces that locally heats the bulk pieces to form structures within the volume, wherein the dielectric fluid quenches the formed structures to form nanoparticles;

filtering the nanoparticles in the dielectric fluid through a screen including holes of a size allowing nanoparticles of the size or smaller to pass through the screen to a region in the container, wherein the dielectric fluid is selected to inhibit oxidation of a surface of the nanoparticles, wherein the filtered nanoparticles include first magnetic nanoparticles, second magnetic nanoparticles, wherein the first magnetic nanoparticles include a size greater than that of the second magnetic nanoparticles, and the second magnetic nanoparticles include a lower melting point than that of the first magnetic nanoparticles; and wherein the method further comprises:

producing a composite magnetic nanomaterial by combining the first magnetic nanoparticles and the second magnetic nanoparticles, and by heating the combined first and second magnetic nanoparticles to a temperature to cause a partially eutectic melt of the second magnetic material, wherein the first magnetic nanoparticles include at least one of Nd—Fe—B, Sm—Co, Co—C, Fe—N, Zr—Co, or Hf—Co, and the second magnetic nanoparticles include at least one of Mn—Bi, Sn, Zn, Sb, Bi, In, Ga, Al, or Mg.

17. The method of claim 7, wherein the dielectric fluid includes at least one of liquid nitrogen or liquid argon.

18. The method of claim 7, wherein the size is in a range of 10 nm to 300 nm.

19. The method of claim 7, further comprising annealing the filtered nanoparticles.

20. The method of claim 19, wherein the annealing is implemented at a temperature in a range of 200 to 300° C. over a time duration in a range of 2 to 24 hours.

21. The method of claim 7, further comprising:

coating the surface of the nanoparticles with smaller nanoparticles; and sintering the coated nanoparticles to form a nanocomposite material including nanoscale grains of the material of the nanoparticles and the smaller nanoparticles along the boundaries of the grains, wherein the smaller nanoparticles inhibit growth of the grains in the nanocomposite material.

22. The method of claim 7, wherein at least one of the electrodes or the bulk pieces comprise a composite material including a metal or alloy and at least one other phase material, and wherein the formed nanoparticles include a multi-phase nanostructure.

23. The method of claim 7, wherein the container includes a first aperture at a top of the container and a second aperture at a bottom of the container, and further comprises:

an upper container to store the bulk pieces and deposit the bulk pieces into the container, the upper container having a hollowed interior with an opening at the bottom and a valve to expose or seal the opening, wherein the opening of the upper container is connected to the first aperture of the container via the valve to control deposition of the bulk pieces into the container; and a lower container to receive the nanoparticles, the lower container having a hollowed interior with an opening at the top and a valve to expose or seal the opening, wherein the opening of the lower container is connected to the second aperture of the container via the valve to control collection of the nanoparticles from the container.

24. The method of claim 7, further comprising:

storing the bulk pieces in an upper container above the container;

operating a valve between the upper container and a lower container to control continuous or semi-continuous deposition of the bulk pieces into the container.

25. The method of claim 7, wherein the mechanical vibrations cause an increased number of local discharge contact points for spark erosion between the bulk pieces in the reaction chamber.

26. The method of claim 7, further comprising rotating two adjacent electrodes of the electrodes in opposite rotations to facilitate formation of the nanoparticles from the bulk pieces.

27. The method of claim 7, wherein the applied electric pulses include a voltage of at least 100 V and at a frequency of at least 60 Hz, and wherein the generated electric field is capable to produce a capacitance discharge between the bulk pieces of at least 20 µF in the formation of the structures.

28. The method of claim 16, wherein the dielectric fluid includes at least one of liquid nitrogen or liquid argon.

29. The method of claim 16, wherein the size is in a range of 10 nm to 300 nm.

30. The method of claim 16, further comprising annealing the filtered nanoparticles.

31. The method of claim 30, wherein the annealing is implemented at a temperature in a range of 200 to 300° C. over a time duration in a range of 2 to 24 hours.

32. The method of claim 16, further comprising:
coating the surface of the nanoparticles with smaller nanoparticles; and
sintering the coated nanoparticles to form a nanocomposite material including nanoscale grains of the material of the nanoparticles and the smaller nanoparticles along the boundaries of the grains,
wherein the smaller nanoparticles inhibit growth of the grains in the nanocomposite material.

33. The method of claim 16, wherein at least one of the electrodes or the bulk pieces comprise a composite material including a metal or alloy and at least one other phase material, and wherein the formed nanoparticles include a multi-phase nanostructure.

34. The method of claim 16, wherein the container includes a first aperture at a top of the container and a second aperture at a bottom of the container, and further comprises:
an upper container to store the bulk pieces and deposit the bulk pieces into the container, the upper container having a hollowed interior with an opening at the bottom and a valve to expose or seal the opening, wherein the opening of the upper container is connected to the first aperture of the container via the valve to control deposition of the bulk pieces into the container; and
a lower container to receive the nanoparticles, the lower container having a hollowed interior with an opening at the top and a valve to expose or seal the opening, wherein the opening of the lower container is connected to the second aperture of the container via the valve to control collection of the nanoparticles from the container.

35. The method of claim 16, further comprising:
storing the bulk pieces in an upper container above the container;
operating a valve between the upper container and a lower container to control continuous or semi-continuous deposition of the bulk pieces into the container.

36. The method of claim 16, wherein the mechanical vibrations cause an increased number of local discharge contact points for spark erosion between the bulk pieces in the reaction chamber.

37. The method of claim 16, further comprising rotating two adjacent electrodes of the electrodes in opposite rotations to facilitate formation of the nanoparticles from the bulk pieces.

38. The method of claim 16, wherein the applied electric pulses include a voltage of at least 100 V and at a frequency of at least 60 Hz, and wherein the generated electric field is capable to produce a capacitance discharge between the bulk pieces of at least 20 µF in the formation of the structures.

* * * * *